United States Patent [19]
Pamer

[11] 3,814,211
[45] June 4, 1974

[54] AIR SPACE VEHICLE SERVICING APPARATUS

[75] Inventor: Karl A. Pamer, Chagrin Falls, Ohio

[73] Assignee: McNeil Corporation, Akron, Ohio

[22] Filed: Mar. 1, 1972

[21] Appl. No.: 230,634

[52] U.S. Cl. ................ 182/14, 182/19, 182/37, 182/142, 182/150
[51] Int. Cl. ............................................. E04g 3/10
[58] Field of Search ............ 182/14, 13, 12, 37, 36, 182/142, 143, 144, 150, 19; 187/71, 27; 60/6

[56] References Cited
UNITED STATES PATENTS

| | | | |
|---|---|---|---|
| 1,554,584 | 9/1925 | Lake | 182/14 |
| 1,564,836 | 12/1925 | Dudley | 60/6 |
| 1,616,743 | 2/1927 | Ericsson | 182/145 |
| 1,699,544 | 1/1929 | Rohlfing | 182/137 |
| 2,553,378 | 5/1951 | Miller | 182/14 |
| 2,647,022 | 7/1953 | Smid | 182/63 |
| 2,815,250 | 12/1957 | Trump | 182/129 |
| 2,979,152 | 4/1961 | Eitel | 182/2 |
| 3,602,335 | 8/1971 | Gustetic | 182/37 |
| 3,645,519 | 2/1972 | Schwarz | 182/71 |

Primary Examiner—Reinaldo P. Machado
Attorney, Agent, or Firm—Watts, Fisher & Heinke Co.

[57] ABSTRACT

Apparatus especially designed for use in servicing the exterior of air and/or space vehicles comprising a vertical oriented telescopic mast, the upper end of which is fixedly connected to a trolley movable linearly on an overhead bridge which bridge is movable on a suitable overhead runway. The lower end of the mast carries a personnel platform rotatably connected thereto and which may include equipment usable in servicing an air or space vehicle. Movement of the bridge on the runway and the trolley on the bridge and extension and contraction of the mast is by power and the controls include safety devices preventing collision between rigid parts of the apparatus and a vehicle which might result in damage to the vehicle. Provision is made for raising the personnel platform by power without reliance on the primary power supply.

20 Claims, 19 Drawing Figures

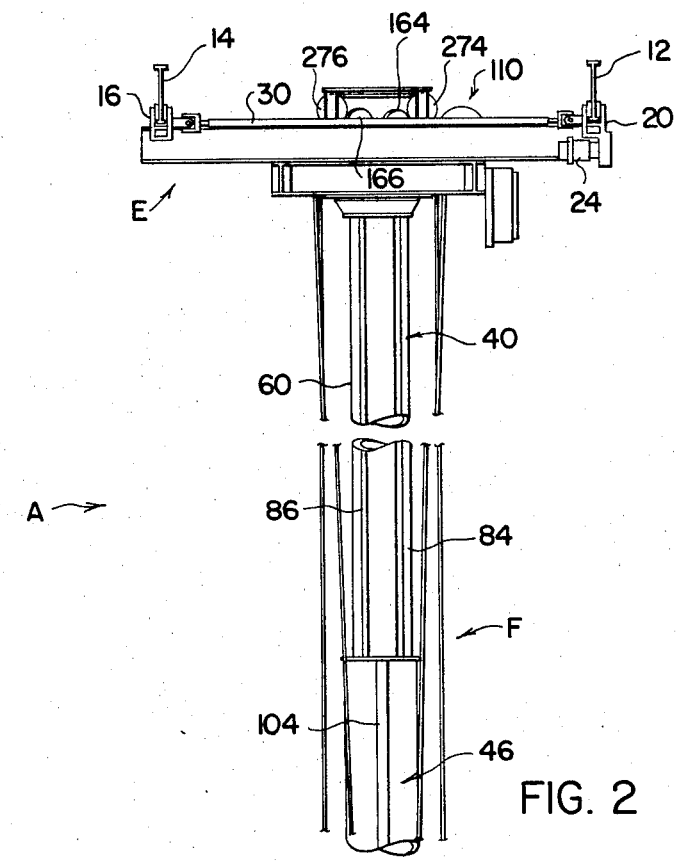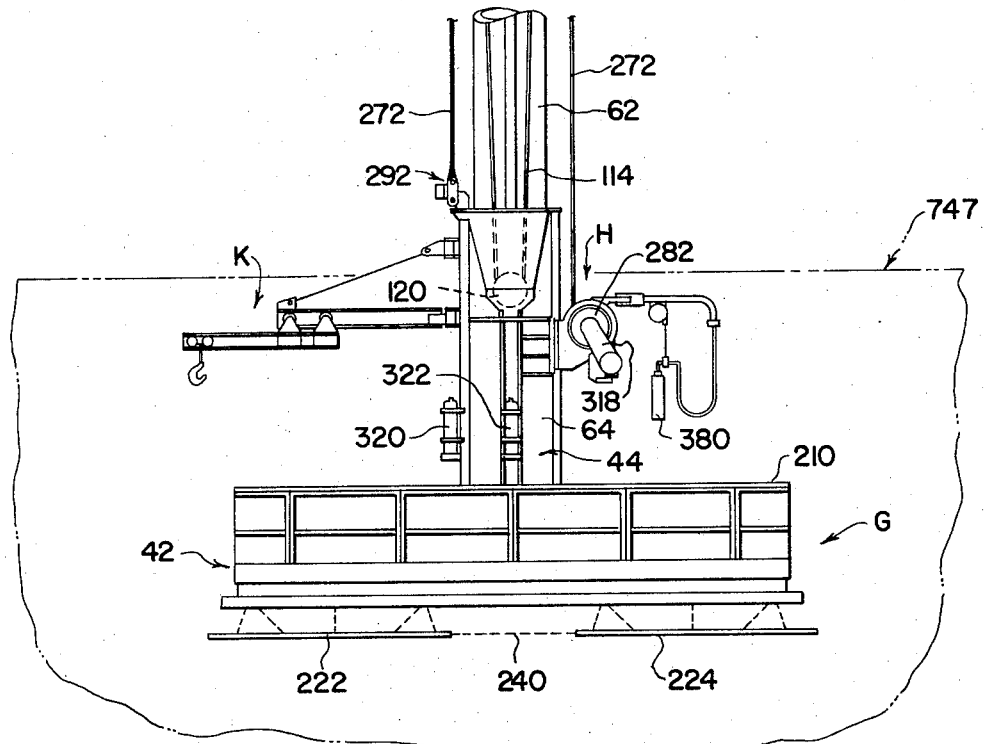
FIG. 2

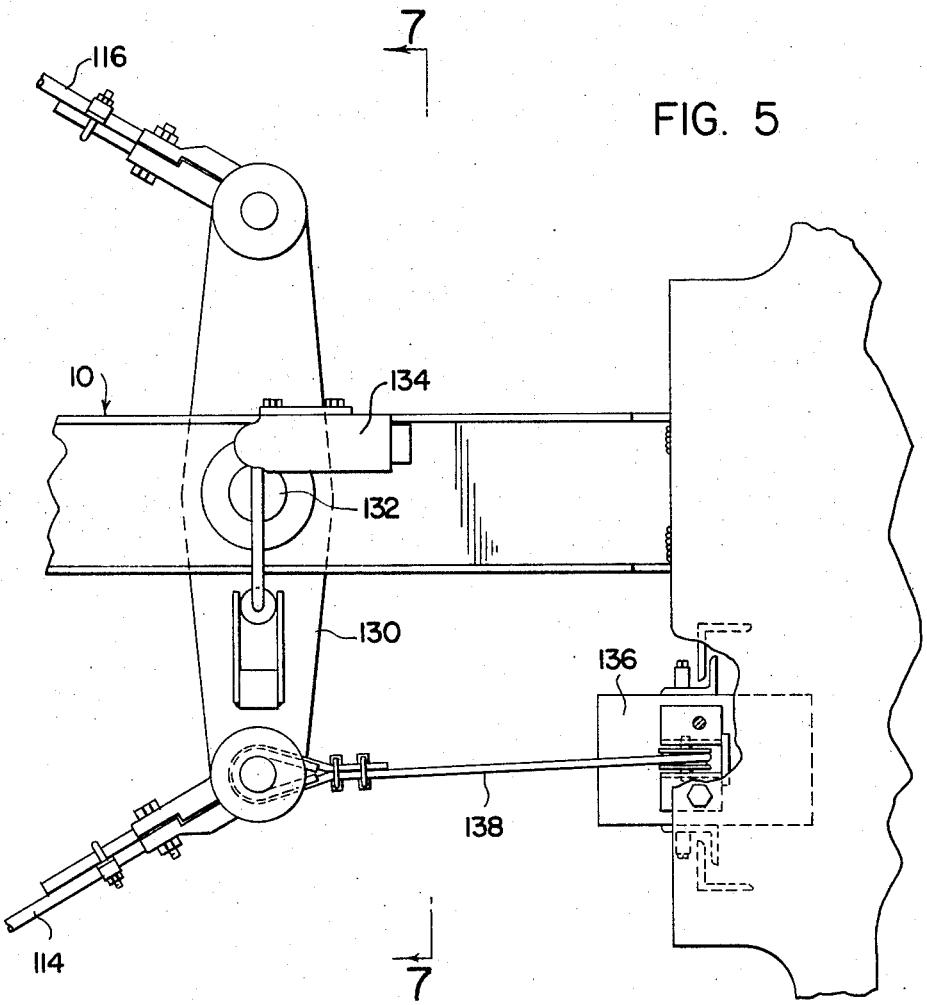
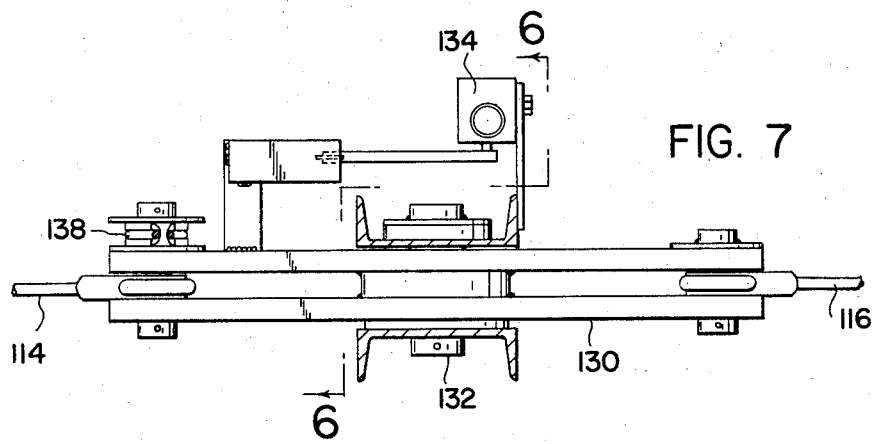

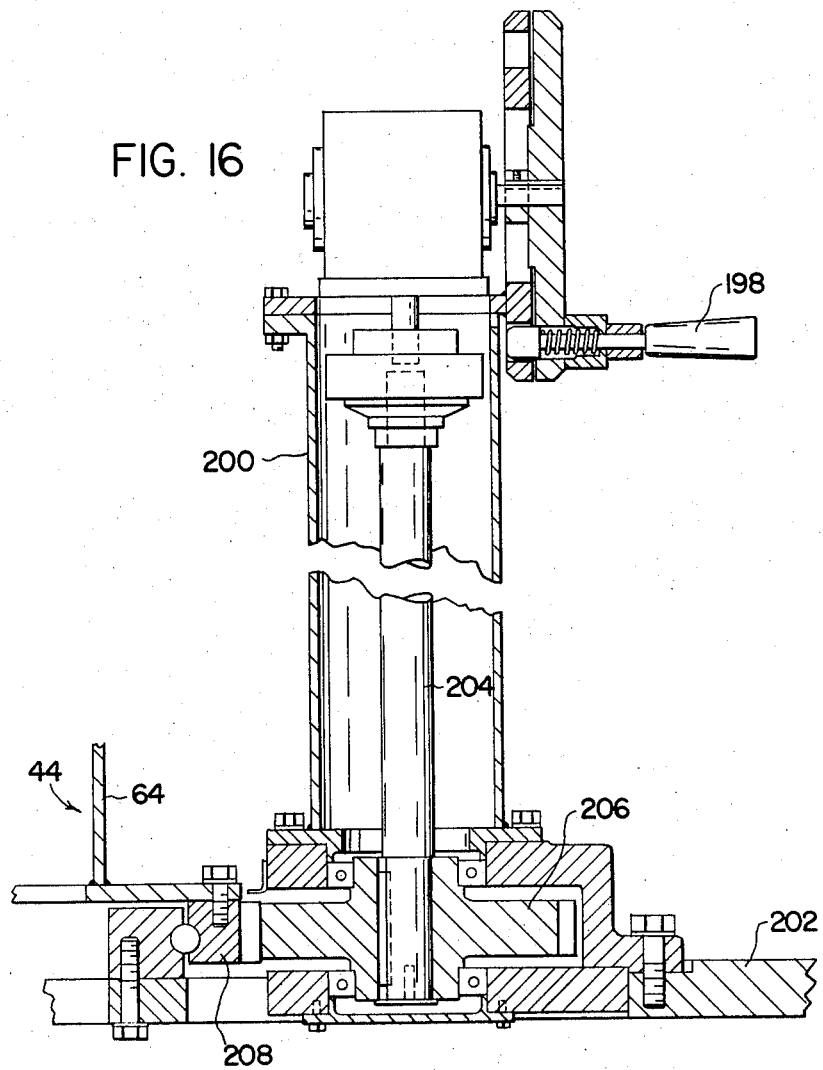

3,814,211

AIR SPACE VEHICLE SERVICING APPARATUS

FIELD OF THE INVENTION

The invention relates to overhead supported load carrying devices especially intended for carrying personnel in servicing the exterior of air-space vehicles, particularly airplanes.

PRIOR ART

Aircraft is commonly serviced by using stationary or movable personnel carrier equipment. In some installations the equipment comprises one or more vertically movable personnel supporting platforms. Personnel supporting platforms connected to the lower end of movable overhead supported telescoping masts have been employed.

SUMMARY OF THE INVENTION

Frequent inspection and other servicing of the exterior of aircraft, especially airplanes, is necessary for obvious reasons. Because of the large size of many airplanes the exterior parts of such vehicles are not readily accessible to service personnel.

The present invention provides a new and novel apparatus for quickly positioning personnel and/or service devices at any desired exterior area of air-space vehicles, such as, aircraft, including those of large size, with minimum inconvenience to service and other personnel.

The invention also provides a new and novel apparatus of the character referred to, comprising controls which will avoid damage to a vehicle with which it may be used.

The invention also provides a new and improved apparatus comprising an overhead support universally movable in a horizontal plane having a depending multi-section extensible and controllable mast having a load support at its lower end, preferably a personnel platform, and means for raising and lowering the load support in combination with a safety device or system including a rotatable drum having a cable connected thereto operatively connected to the overhead and load supports, means for biasing the drum to maintain the cable taut, a brake operatively connected to the drum, and means for automatically applying the brake under abnormal conditions.

The invention further provides a new and novel apparatus of the character referred to comprising a convenient way of testing the safety device or system, thus better assuring its operability when needed.

The invention still further provides a new and novel apparatus of the character referred to comprising means operable for quickly raising depending parts independent of the normal power source used to operate the various parts of the apparatus.

Further objects and advantages of the invention will be apparent to those skilled in the art to which it relates from the following description of the preferred embodiment described with reference to the accompanying drawing forming a part hereof.

BRIEF DESCRIPTION OF DRAWINGS

FIG. 2 is a fragmentary side elevational view of the apparatus shown in FIG. 1;

FIG. 5 is a fragmentary enlarged view of a portion of FIG. 4;

FIG. 7 is a view approximately on the line 7—7 of FIG. 5;

FIG. 16 is an enlarged sectional view approximately on the line 16—16 of FIG. 12;

DESCRIPTION OF PREFERRED EMBODIMENT

Figure 1:
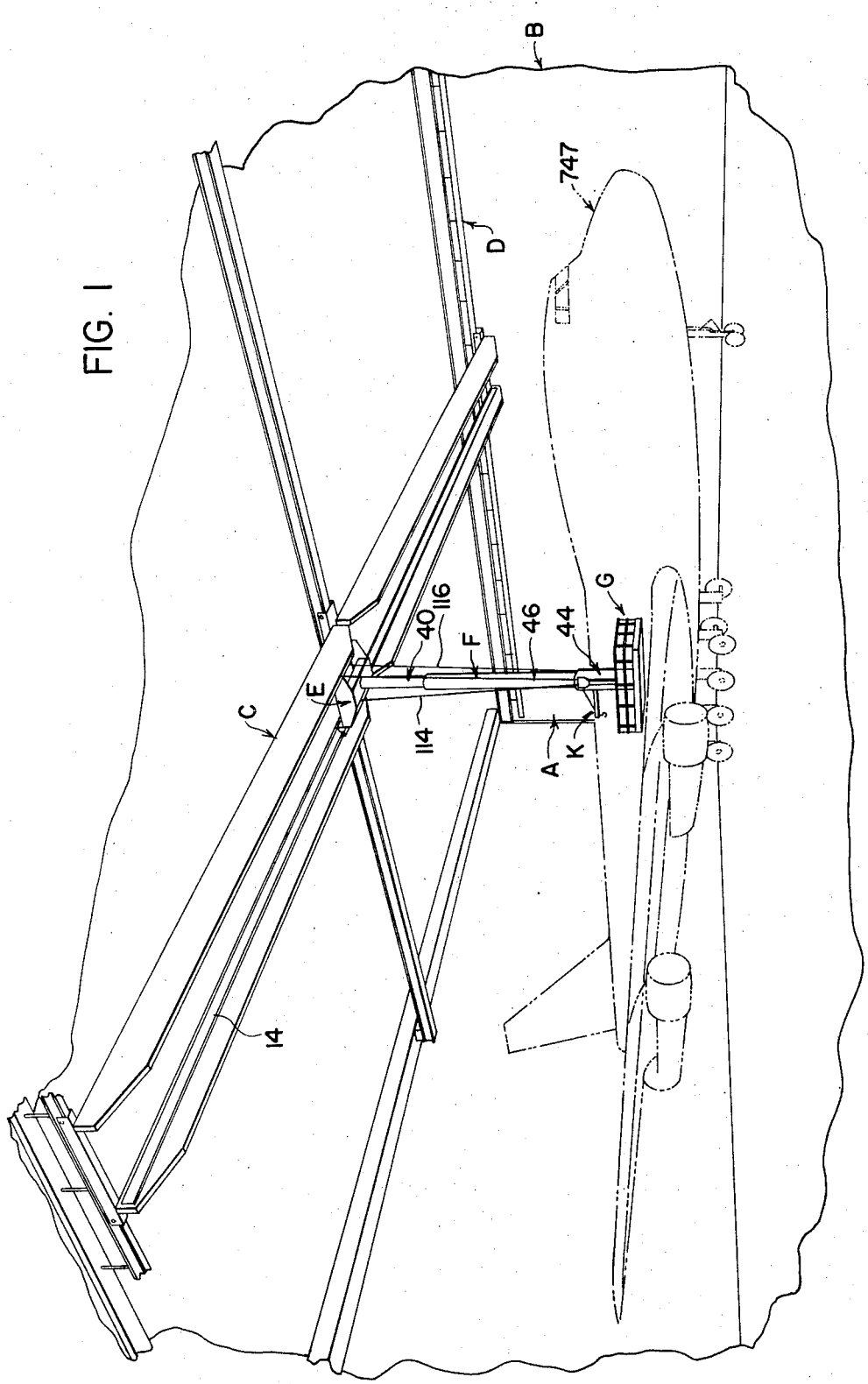
FIG. 1 is a fragmentary perspective view of the interior of an airplane hanger having installed therein an embodiment of the present invention.

The invention is shown embodied in apparatus, designated generally by the reference character A, installed in an aircraft hanger B for servicing large airplanes, for example, a so-called "747" one of which is shown in phantom lines in FIG. 1 and designated generally by the reference character 747.

The apparatus comprises an overhead crane bridge C supported for movement in opposite directions in a runway D and having a trolley E supported on the bridge C for movement in opposite directions therealong, which directions are normal to the direction of movement of the bridge C on the runway D. The trolley E which constitutes an overhead support universally movable in a horizontal plane carries a depending telescopic mast F having its upper end fixedly connected to the trolley and at its lower end a service personnel platform assembly G.

The particular construction of the hanger B, the bridge C and the runway D forms no part of the present invention and is not herein shown and described in detail. Suffice it to say that because of the length of the extended mast F and the size of the platform, 12 feet by 20 feet in the illustrated embodiment, and the requirement that the platform has minimum sway the bridge C, trolley E, etc. are made as rigid as is consistent with other requirements. The bridge C shown is of the double girder construction with the girders spaced about 16 feet on centers and has a span/deflection ratio of 1,400 or greater. The bridge is moved lengthwise of the runway by suitable reversible two-speed electric motors with brakes, sized to the load to produce smooth, general acceleration and deceleration so as to minimize the dynamic stresses in the apparatus due to acceleration and deceleration. The brakes hold the bridge stationary when power is not being applied to the bridge travel motors. The controls for the bridge travel motors include slow down and stop limit switches adjacent both ends of the runway so that the bridge will not engage bumpers at opposite ends of the runway while under power.

The trolley E comprises a rigid frame designated generally by the reference character 10 supported on beam-type rails, 12, 14 of the bridge by four-wheeled trucks 16, 18, 20, 22, at least two of the wheels of each of which are driven by suitable reversible two-speed electric motors 24, 26, with brakes connected to and forming a part of trucks 20, 22. The wheels of the trucks 16, 18 are driven from trucks 20, 22, respectively by suitable drive shafts, 30, 32 extending transversely of the direction of movement of the trolley. The trolley travel motors 24, 26, like the bridge travel motors are tailored to the load to effect smooth, gentle acceleration and deceleration. The electric control and power circuits for operating the bridge travel motors, the trolley travel motors and the various devices carried by the trolley, etc. are made by bar-type conductors engaged by suitable current collectors, electric cables, manual and limit switches, etc. in a conventional manner.

The mast F is collapsible and extensible and comprises an upper mast assembly or section 40 fixedly connected to the trolley E. The platform assembly G comprises a platform proper 42 rotatably connected to the lower end of a tubular platform mast or skirt assembly 44 slidable on the lower end of an intermediate or telescopic mast assembly or section 46. The fixed upper mast section or assembly 40 shown comprises a cylindrical metal tube 60 about 2 feet in diameter and about 40 feet long. Because mast section 40 is the upper mast section and has the greatest effect on motion of the platform due to mast deflection the tube 60 is constructed of relatively heavy material for rigidity and has its upper end extending into the trolley frame 10 and fixed thereto preferably by a deep socket connection especially designed to transfer the shear and momentum loads to the rigid trolley frame.

The movable intermediate mast assembly or section 46 comprises a cylindrical aluminum tube 62 of suitable wall thickness having an inside diameter about 6 inches larger than the outside diameter of the member 60 and a length approximately the same as that of the member 60. The platform skirt or mast section assembly 42 comprises a cylindrical aluminum tube 64 of suiable wall thickness having an inside diameter about 4 inches larger than the outside diameter of the member 62 and a length of approximately 15 feet. Since the members 62, 64 are of progressively larger diameter than the member 60 they are inherently more rigid.

The intermediate movable or telescoping mast section 46 is guided for vertical movement alng the fixed mast section 40 by a set of four cylindrical rollers 66, 68, 70, 72 connected to the member 62 adjacent to its upper end and a second similar set connected to the member 62 below the first set, for example, about 10 feet therefrom. The rollers of each of the respective sets are adjustably connected to the member 46, are located 90° from one another about the vertical center of the mast, and engage and travel along flat metal strips 80, 82, 84, 86 suitably secured, as by welding, to the exterior of the member 60 of the fixed mast section 40. The roller tracking strips 80, 82, 84, 86, extend substantially the length of that part of the member 60 which is below the frame 10 of the trolley and are machined to careful tolerances to insure straightness and parallelism. The rollers 66, 68, 70, 72 are made of a yieldable plastic, preferably a polyurethene plastic, and because they engage and roll along flat surfaces on the tracking strips, can be and are set up with zero clearance, preferably a slight preload. The construction prevents rotation of the movable mast section 46 relative to the fixed mast section 40 without the necessity for further guides. Such further guides, however, are employed in the embodiment shown in the form of a pair of rollers 87 carried on the interior of the member 62 of the telescoping mast section and engageable with opposite sides of an outwardly projecting flange of a vertically extending T-iron 88 welded to the exterior of the member 60 of the fixed mast section and similar rollers 89 on the interior of the sleeve or skirt 64 which engage opposite sides of the projecting flange of a vertically extending T-iron 90 welded to the exterior of the member 62 of the telescoping mast section 46.

The skirt assembly 44 is guided for vertical movement along the member 62 of the telescopic mast assembly 46 by two sets of four rollers 92, 94, 96, 98 similar to the rollers 66, 68, 70, 72, adjustably connected to the member 64 for movement along four flat metal tracking strips 100, 102, 104, 106, similar to the tracking strips 80, 82, 84, 86 fixed to the exterior of member 62. Since the member 64 is shorter than the member 62 the second or lower sets of rollers, carried by the member 64, are merely spaced about 5 feet below the upper end of the member. For purposes of facilitating manufacture, etc., the sets of rollers 92, 94, 96, 98 are offset 45° about the vertical axis of the mast from the sets of rollers 66, 68, 70, 72. The fact that the rollers which guide the movable mast sections engage the members along which they travel with zero clearance or a preload together with the fact that each movable member is guided by two spaced sets of rollers results in a very rigid mast free from side to side sway.

The platform assembly G is raised and lowered a distance of approximately 65 feet in the embodiment shown, relative to the upper mast section 40 by a heavy duty high lift wire rope hoist unit 110 on the trolley E. The hoist unit 110 comprises a cable drum 112, right and left-hand scored, for two independent cables 114, 116 each having one end connected to the drum. From the drum 112, cables 114, 116 extend downwardly along opposite sides of the mast where they are reeved about lifting sheaves 120, 122 rotatably connected to the member 64 adjacent to its upper end. From the sheaves 120, 122 the cables 114, 116 extend upwardly and after reeving about suitable idler sheaves in the trolley frame including idler sheaves 124, 126, respectively, are connected to opposite ends of a cable load equalizing lever or beam 130 pivotally connected at its center by a pivot pin 132 to the frame 10 of the trolley E. The cables 114, 116 are sized such that either will support the full load with a safety factor in excess of 3 to 1. With both cables in tact, each one carries only one-half of the load so the normal operating safety factor is over 6 to 1.

Because the motion required of the equalizer beam 130 to balance the cable loads is normally relatively small it is employed for sensing unusual conditions, such as, slack or a broken lifting cable or cables. Substantial motion of the beam 130 resulting upon the occurrence of any serious unbalance, for example, a broken cable, actuates a "slack lift cable" switch 134 mounted near the beam 130 in the control for the main hoist which will prevent operation thereof and set an auxiliary safety device or system H. A heavy weight 136 attached to the beam 130 by a cable 138 is provided to pivot the lever and operate the switch 134 in the event both cables 114, 116 go slack, for example, upon the mast reaching the limit of its extension, and exert no pull on either end of the equalizer beam 130.

The hoist cable drum 112 is powered by a heavy duty wound rotor variable speed motor 140 which permits the proper hoisting and lowering speed control required when operating near aircraft. The motor 140 is equipped with a high capacity heavy duty direct acting disc-type "main hoist" brake mounted directly on the motor shaft. The hoist motor brake is spring set and electric solenoid released and is thus a fail safe device since the brake is fully applied whenever the hoist motor 140 does not have power applied to it. The hoist 110 is also equipped with an internal mechanical "main hoist load" brake 142 which is set by the load on the cables 114, 116 and requires operation of the motor 140 to lower the load. The load brake will hold the load unless there is power on the hoist motor 140 and prevents the load from descending faster than the speed of the motor 140 permits. The load brake 142 also functions as a protective device against the remote possibility of a broken hoist motor shaft.

The movable telescopic mast section 44 is raised by a counterweight J located in the interior of the member 60 of the fixed mast section 40 and connected to the member 62 of the movable mast section by two independent dual cables 160, 162 reeved about suitable sheaves 164, 166 rotatably supported in the frame 10 of the trolley. Opposite ends of the cables 160, 162 are connected to the member 62 adjacent to its lower end and to a cable balancing beam 168 located below and pivotally connected at its center to the counterweight J. The cables are sizes so that either will support the counterweight and a limit switch 164 in the control for the main hoist motor 140 is located on the counterweight in position to be operated by a trip on the load equalizing member 168 in the event of a broken or slack counterweight cable and stop and/or prevent operation of the main hoist motor and set the safety brake 286.

The counterweight J shown is approximately 4 feet long and is guided as it moves vertically within the tubular member 60 of the fixed mast assembly by two sets of four rollers 170, 172, 174, 176, one adjacent to each upper and lower end of the counterweight. The rollers are similar to the rollers 66, 68, 70, 72, previously described, and are adjustably connected to the counterweight and set so that there is a slight clearance between the rollers and the interior of the member 60. The construction is such that as the platform assembly G is raised and lowered by the hoist unit 110 the telescopic mast section 46 moves therewith until the upper end of the member 62 abuts or engages a stop in the form of a plurality of brackets 180 connected to the underside of the frame 10 of the trolley E and the upper end of the member 60. Thereafter the skirt assembly 44 moves vertically over the member 62 of the movable mast section 46. Immediately prior to engaging the members 180, a flange 181 on the upper end of the member 62 of the telescoping mast section 46 actuates a normally open "mast sequence" switch 182 connected to the underside of the trolley frame 10. The sequence limit switch 182 is connected in the control for the main hoist motor 140 in parallel circuit with a normally closed second "mast sequence" switch 184 on the interior of the member 64 of the platform assembly G which switch is opened upon the platform assembly moving away from its lowest position at the lower end of the telescoping mast section 44 by the disengagment of the operating arm or lever 186 of the switch 184 from a flange 188 at the lower end of the member 62. When both switches 182, 184 open a "platform jam" light 190 on the control panel 192 lights. The control panel 192 is on the platform assembly G. A "mast jam override" pushbutton switch 194 is provided on a control panel 192 for overriding the switches 182, 184, as desired. As the intermediate mast section 46 reaches the upper limit of its travel the actuation of limit switch 182 by the upper end thereof to stop the main hoist motor 140 also closes a second set of contacts of limit switch 182 to light a "mast up" light 197 on a control panel 192.

The platform proper 42 of the platform assembly G is rectangular in plan and, as previously stated, is rotatably supported on the lower end of the platform mast or sleeve assembly 44. The platform 42 is rotated about the lower end of the sleeve assembly by a handcrank 198 affixed to the outer end of a horizontal shaft rotatably supported in a vertical pedestal 200 extending upwardly from the floor 202 of the platform. The shaft to which the handcrank 198 is connected is in turn connected by miter gears to a vertical shaft 204 extending downwardly through the pedestal and has affixed to its lower end a pinion gear 206 in mesh with a bull or ring gear 208 fixed to the member 64 of the sleeve assembly 44 adjacent to its lower end. As an alternative construction the handcrank 198 for rotating the platform 42 about the lower end of the mast could be replaced by a suitable electric motor, as desired. Manual rotation of the platform is preferred as it assures operator's attention and surveillance of the platform rotation.

The platform 42 is provided with a guard rail 210 having suitable gates 212 and folding steps 214 for the protection of and for the entrance and exit of service personnel, etc. In addition to being adapted for carrying service and like personnel the platform 42 is adapted for carrying various service devices, for example, step ladders, a high level platform, a windshield replacing platform, etc. The apparatus disclosed also comprises two section extensible and contractable gib crane K connected to the sleeve assembly 44 usable in servicing various parts of the airplane, for example, replacing a windshield.

The platform proper is equipped with a "bumper" sensing device in the form of an abuttment ring assembly 220 suspended below the platform proper and overhanging all four edges. The safety bumper ring assembly 220 comprises two ring members 222, 224, one suspended below each end of the platform 42 by a plurality of chains 226, 228, respectively, connected to operating arms or levers of a plurality of series connected "bumper ring" switches 230, 232, respectively, connected to the platform and which switches each have two sets of normally closed contacts the first set of one or more of which will be opened when either or both members 222, 224 of the bumper or abuttment ring assembly is displaced a few inches horizontally or vertically, stopping all power movement of the platform proper 52 some distance from any surface contacted by the ring. The platform may be moved closer to the contacted surface if required by means of a by-pass or "bumper override" push button switch 250 on the control panel 192 of the platform assembly G. As the platform 42 is moved closer, the ring assembly 220 continues to be displaced until one or more of the second contacts on the "bumper ring" switches opens to again stop all powered motions and causes a warning horn to blow. A "bumper off" push button switch 254 is provided on the control panel 192 to move the trolley, bridge or platform, as the case may be, in an appropriate direction when actuated to move the platform away from the touched surface. The adjacent sides of the ring members 222, 224 are connected to one another by chains 240, 242 located outwardly of the platform. The flexible members 240, 242 allow either bumper ring members 222, 224 to move towards the other without causing movement of the other.

When the mast F is wholly retracted the lower ends of the fixed and movable mast sections 40, 46 projects through the platform but are preferably higher than the main fuselage of the largest airplane to be serviced by use of the apparatus so that the apparatus can be readily moved from one side of the airplane to the other, etc. It is also desirable that the bumper sensing ring assembly 220 remains the lowest element of the apparatus until it is raised above the lower end of the telescoping mast assembly 46 in its uppermost position. The mast sequence limit switches 182, 184 assures this sequence of operation and that the rollers of the telescoping mast assembly 46 properly roll upon the fixed mast assembly 40 and that the counterweight J lifts the telescoping mast assembly 46 with the lifting of the platform assembly G. The sequence switches 182, 184 also assures that the telescoping or intermediate mast section remains fully up until the weight of the platform assembly G bears against outwardly extending flanges 256 on the lower end of the telescoping mast by the engagement thereagainst of inwardly extending members 258 on the interior of the member 46 and thereby overcomes the lifting force of the counterweight J. Similar flange members 260 on the lower end of member 60 are engaged by inwardly extending member 262 on the interior of the member 62 to limit downward movement of the intermediate mast section 46 relative to the stationary mast section 40.

Although the heavy duty hoist 110 is provided with two fail-safe brakes, i.e., the main hoist motor brake and the load brake, the apparatus incorporates an entirely separate and independent safety device or system H, previously mentioned, to protect against unusual failures in the hoisting system which might conceivably occur. The safety system H comprises a second and independent heavy drum 270 securely mounted on the platform mast or skirt assembly 44 and supplied with a cable 272. The cable 272 is reeved up and over heavy sheaves 274, 276 mounted in the trolley frame and anchored back on the opposite side of the platform mast assembly 44. The cable drum 270 is connected to a unidirectional torque motor 282 which provides power to wrap the cable 272 on the drum 270 when the main hoist 110 lifts the platform assembly G and maintains a nearly constant suitable tension in the cable 272, preferably about 600 pounds, regardless of the driving direction of the main hoist motor 140. The safety cable carries no appreciable load as long as the main hoist 110 is operating properly, yet it is always ready to assume the full load without any delay.

The shaft of the torque motor 282 extends through the center of the cable drum 270 and is connected by a planetary-type speed reducer 284 to the adjacent end of the drum 270. The end of the torque motor shaft to which the speed reducer 284 is connected is provided with a large heavy duty direct acting, spring applied and fluid pressure released "safety system" brake 286. The brake 286 is released by the application of fluid pressure to a reciprocating-type fluid pressure actuated motor 288. The flow of fluid pressure to and from the motor 288 is controlled by a solenoid actuated valve, the solenoid of which is wired to respond instantly upon the occurrence of certain operations, for example, the opening of one of the bumper ring switches 230, 232. Because of its extremely rapid response time and short stopping distance, the safety system H in conjunction with the bumper ring assembly 220 and its associated switches 230, 232 effectively prevents movement of the platform assembly G onto the vehicle.

The anchor assembly 292 for connecting the cable 272 to the platfrom mast 44 includes a normally closed "slack safety cable" switch 294 connected to the control for the safety system brake 286 and when opened sets the safety system brake. The anchor assembly 292 includes a counterweight 296 for moving a link 298 in the connection between the cable 272 and the upper end of the telescoping mast section 46 away from the switch 294 in the event of the cable 272 becoming slack.

The control panel 192 on the platfrom assembly G contains a number of manually operable control switches including a "SAFETY DEVICE TEST" push button switch 300 which will activate the safety system H without disturbing other circuits. A suggested test procedure is to slowly raise the platform assembly G a small amount above its lower position by properly setting a "high-low speed" selector switch 302 and subsequently depressing a main "hoist up" push button 304 on the control panel. A slow speed down movement of the platform is then initiated by depressing a "hoist down" pushbutton switch 306 and while keeping this active, the safety device test button 300 is depressed to apply the safety system brake 286. As the brake 286 assumes the weight of platform assembly G, the hoist 110 will continue to lower until the slack cable limit switch 134 operates to stop the main hoist 110. Removing the finger from the safety device test push button 300 should not now release the safety system brake 286, since it will also be activated by the slack cable limit switch 134. In this manner a check test will have been performed to prove the operation of the mechanical and electric operation of the safety system H, the mechanical operation of the slack main hoisting cable sensing device, and the circuitry between the slack cable limit switch 134 and the solenoid for the safety system brake 286.

The apparatus is also provided with an emergency hoisting system designated generally as M not dependent on the electrical power supply of the hanger and which can be manually activated to automatically raise the platform assembly G and permit removal of the aircraft from the hanger B under emergency conditions. The device M consists essentially of a fluid-operated rotary motor 310 connected to the safety system tensioning torque motor 282 through a gear reducer 314, a fluid pressure operated normally released clutch 316 and a dual chain sprocket drive 318 connecting the driven member of the clutch 316 to the shaft of the torque motor 282. The clutch 316 is normally disengaged so that the motor 310 will not add to the load on the torque motor 282 during operation of the main hoist 110. Fluid for operating the motor 310, engaging the clutch 316 and releasing the brake 286 is supplied from cylinders 320, 322 mounted on the platform skirt assembly 44 charged preferably with nitrogen gas at high pressure (approximately 180 atmospheres). The cylinders 320, 322 are connected by a pressure regulating valve 324 (set to deliver about 90 PSI) and a three-way manually controlled valve 326 on the platfrom assembly G.

Upon the opening of three-way valve 326 fluid under pressure will be supplied to the clutch 316, the brake releasing cylinder 288 and the motor 310 and upon the clutch 316 being engaged and the brake 286 released the motor 310 will operate to raise the platform assembly G, preferably to a position about the hanger floor sufficient to allow any aircraft in the hanger to be moved from the hanger.

A reserve capacity is preferably designed into the cylinders 320, 322 so that the platform assembly G will normally rise somewhat above the required minimum elevation before the pressure is exhausted. A pressure responsive switch 328 is connected in the fluid line between the cylinders 320, 322 and the pressure regulator 324 which upon loss of pressure will act to apply the safety brake 286 of the system H which is more than adequate to hold the weight of the platform assembly G.

Figure 3:
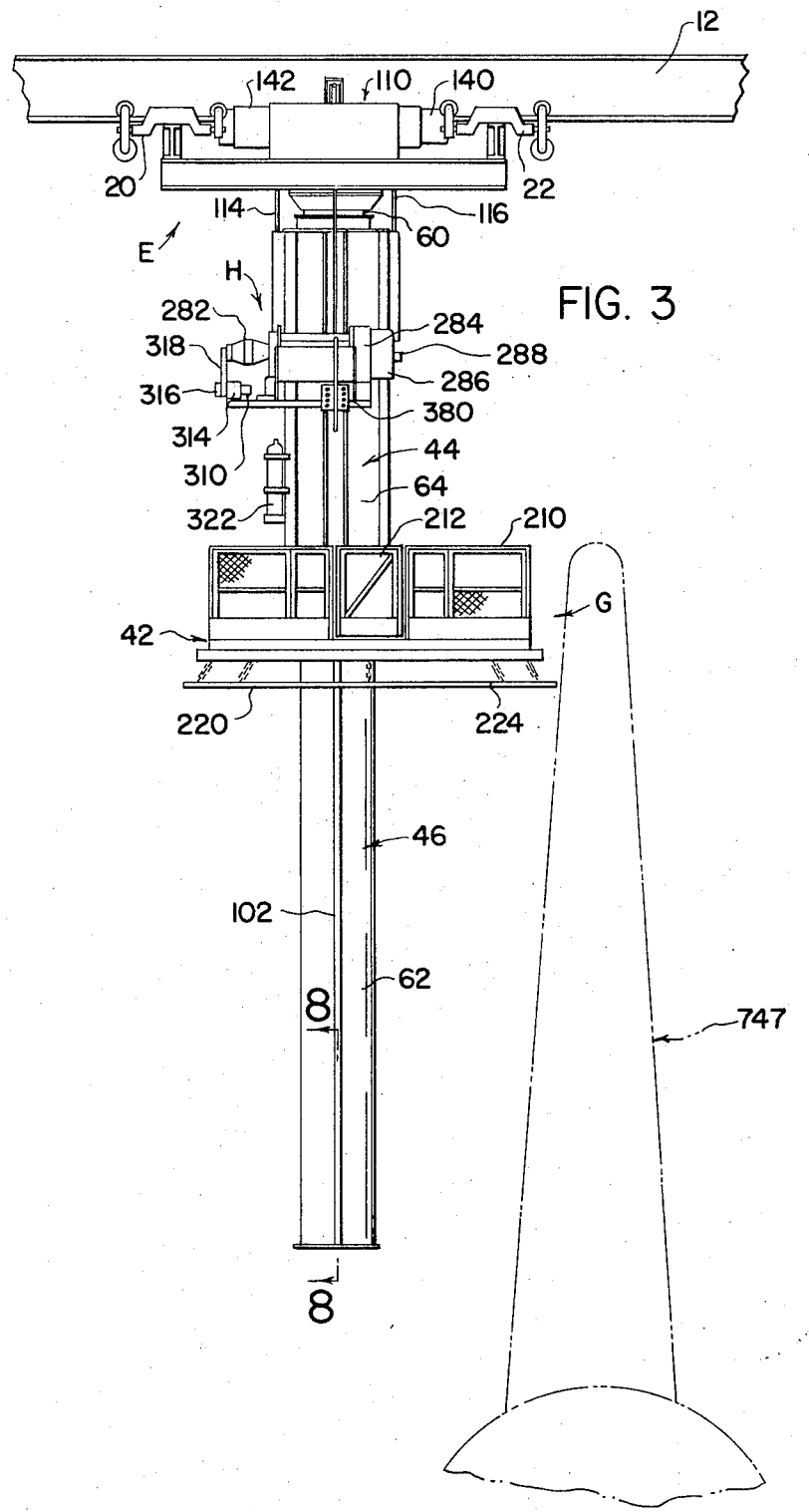
FIG. 3 is a view of the apparatus shown in FIG. 2 looking from the right with a part broken away on other parts in a different operation position.
Figure 4:
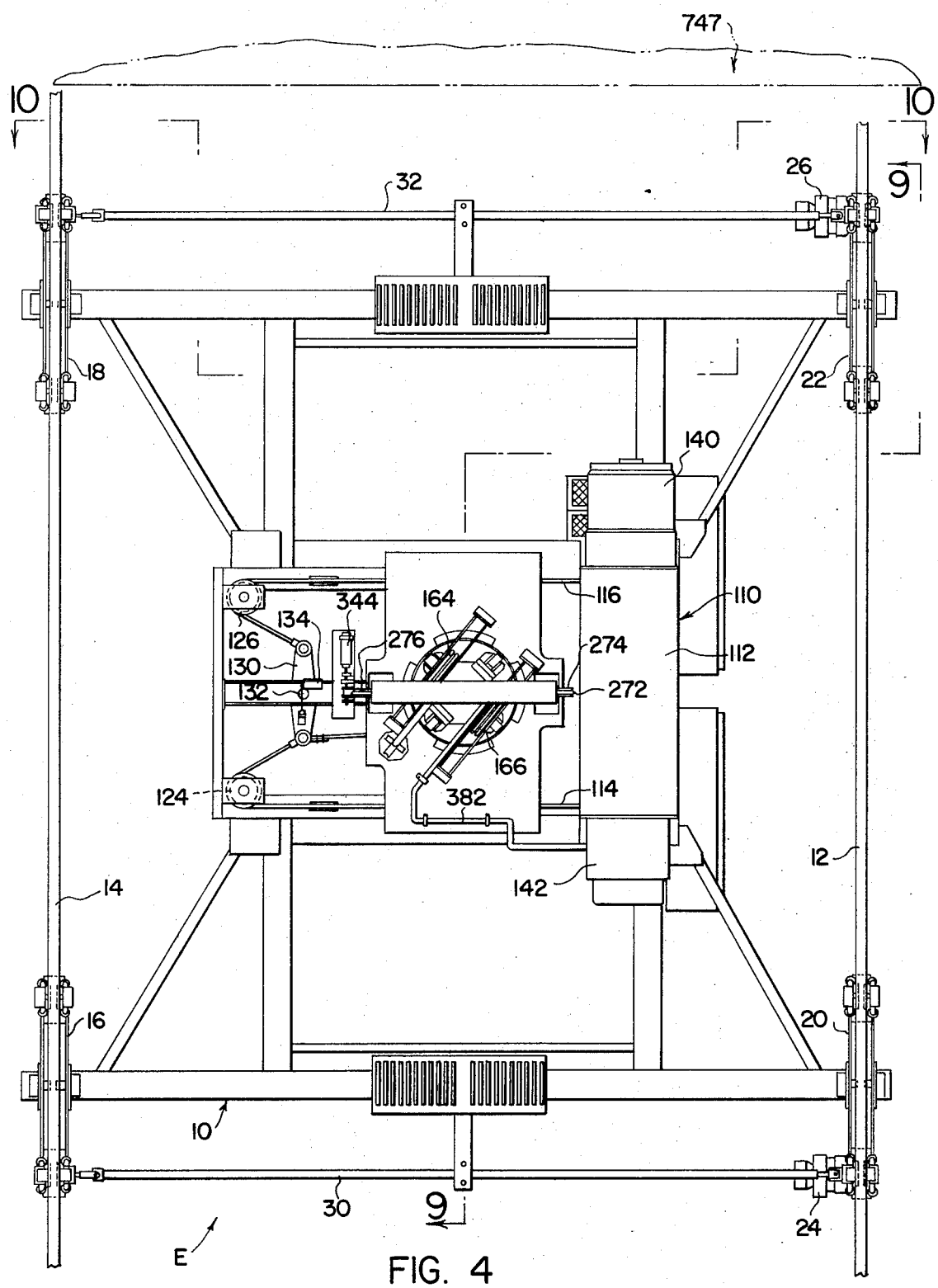
FIG. 4 is a fragmentary plan view of the apparatus.
Figure 6:
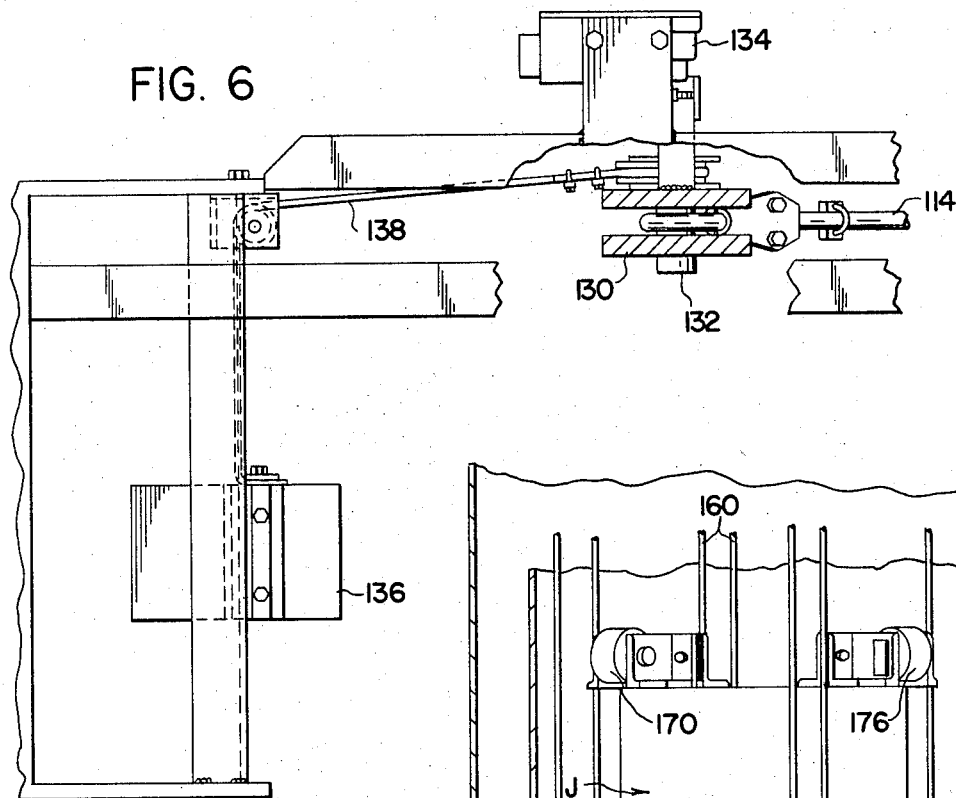
FIG. 6 is a view of FIG. 5 looking from the right.
Figure 8:
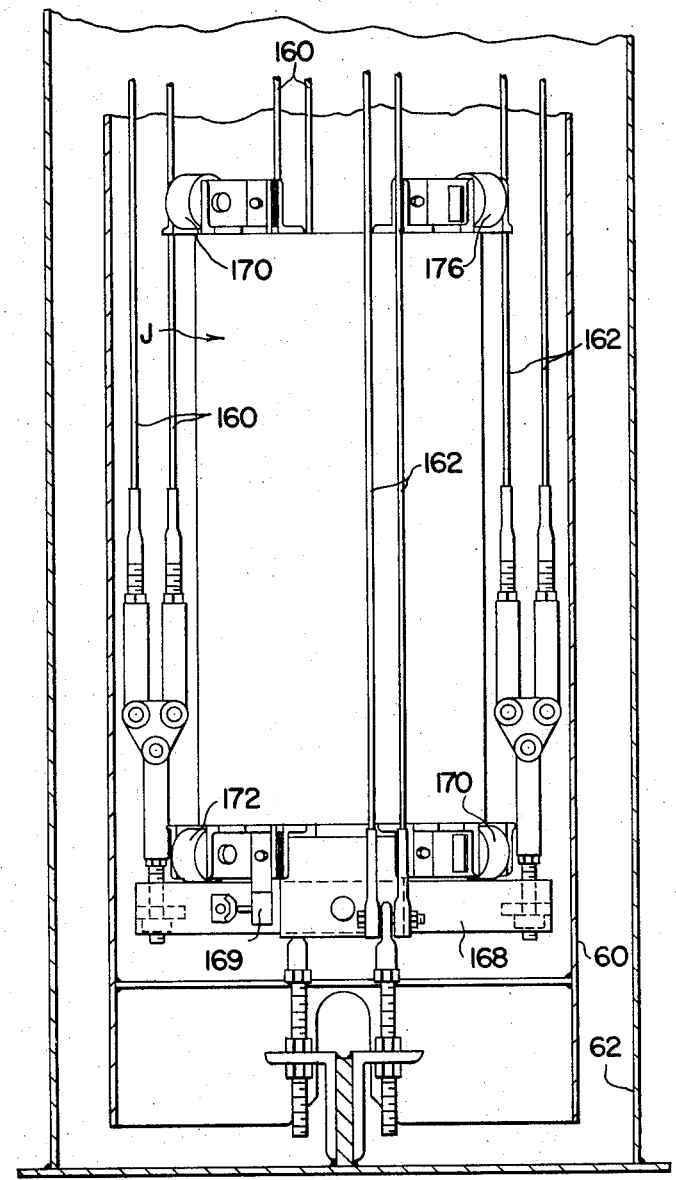
FIG. 8 is a fragmentary sectional view approximately on the line 8—8 of FIG. 3.
Figure 9:
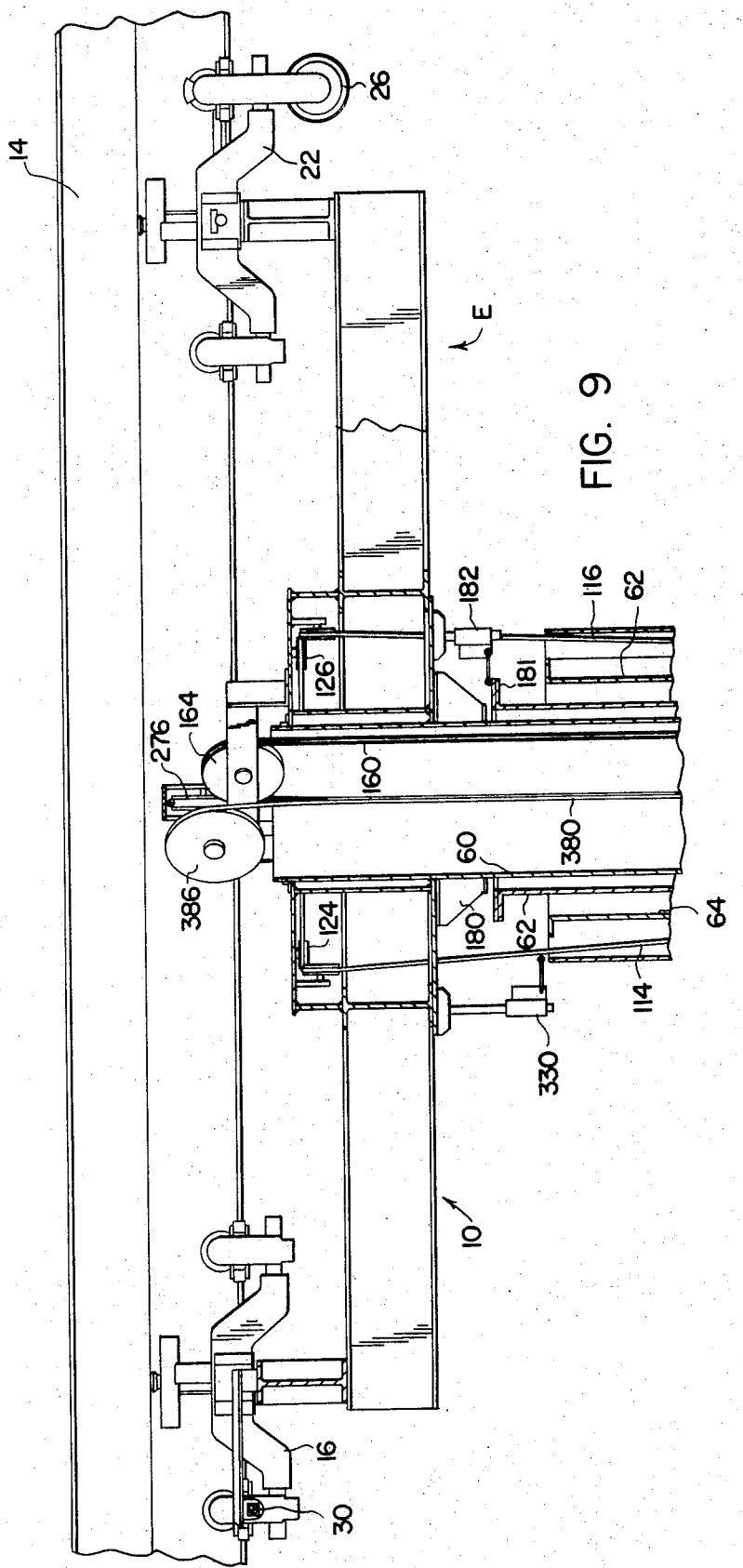
FIG. 9 is a fragmentary view approximately on the line 9—9 of FIG. 4 with parts in a different operating position from that shown in FIGS. 1 and 2.
Figure 10:
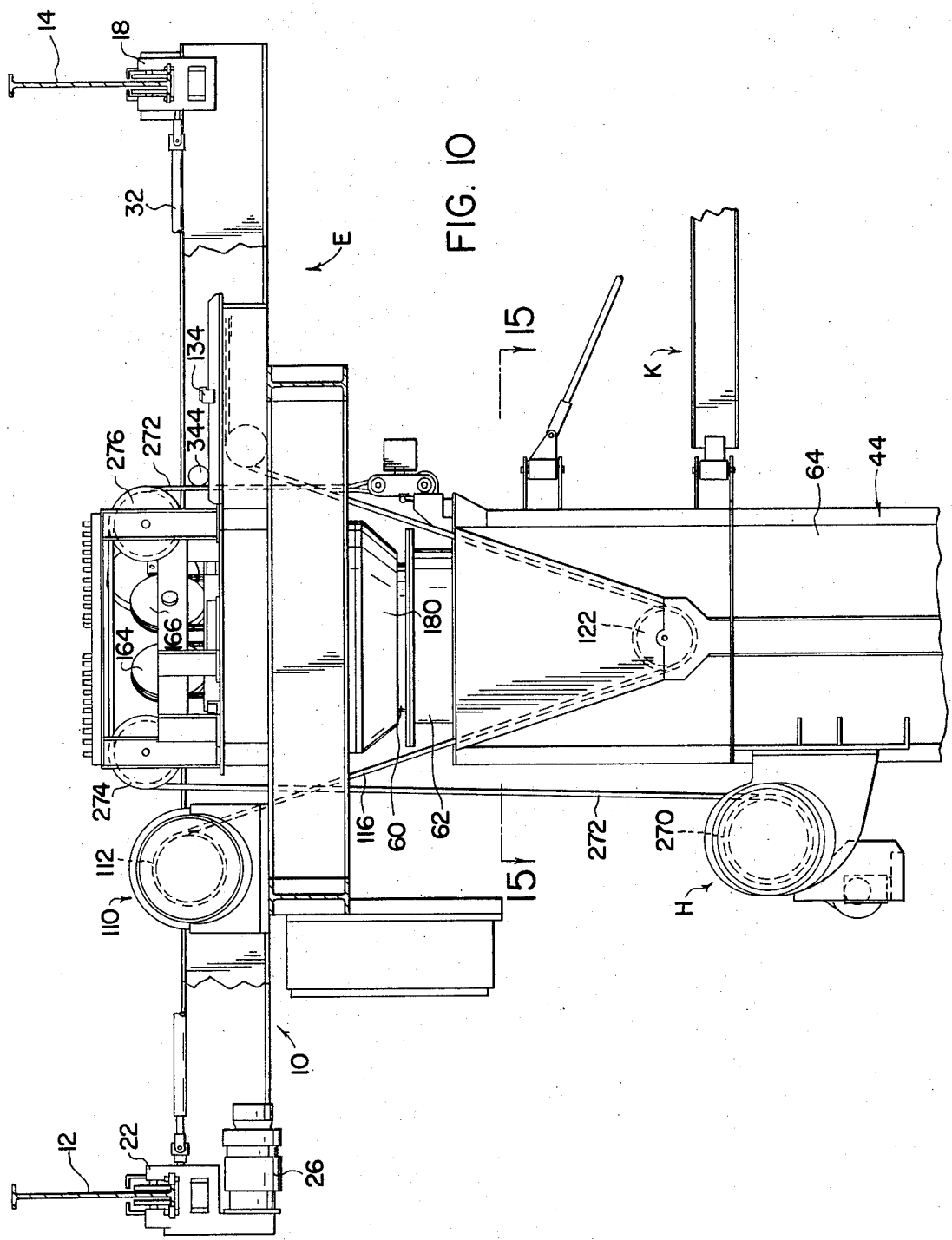
FIG. 10 is a view similar to FIG. 8 approximately on the line 10—10 of FIG. 4.
Figure 11:
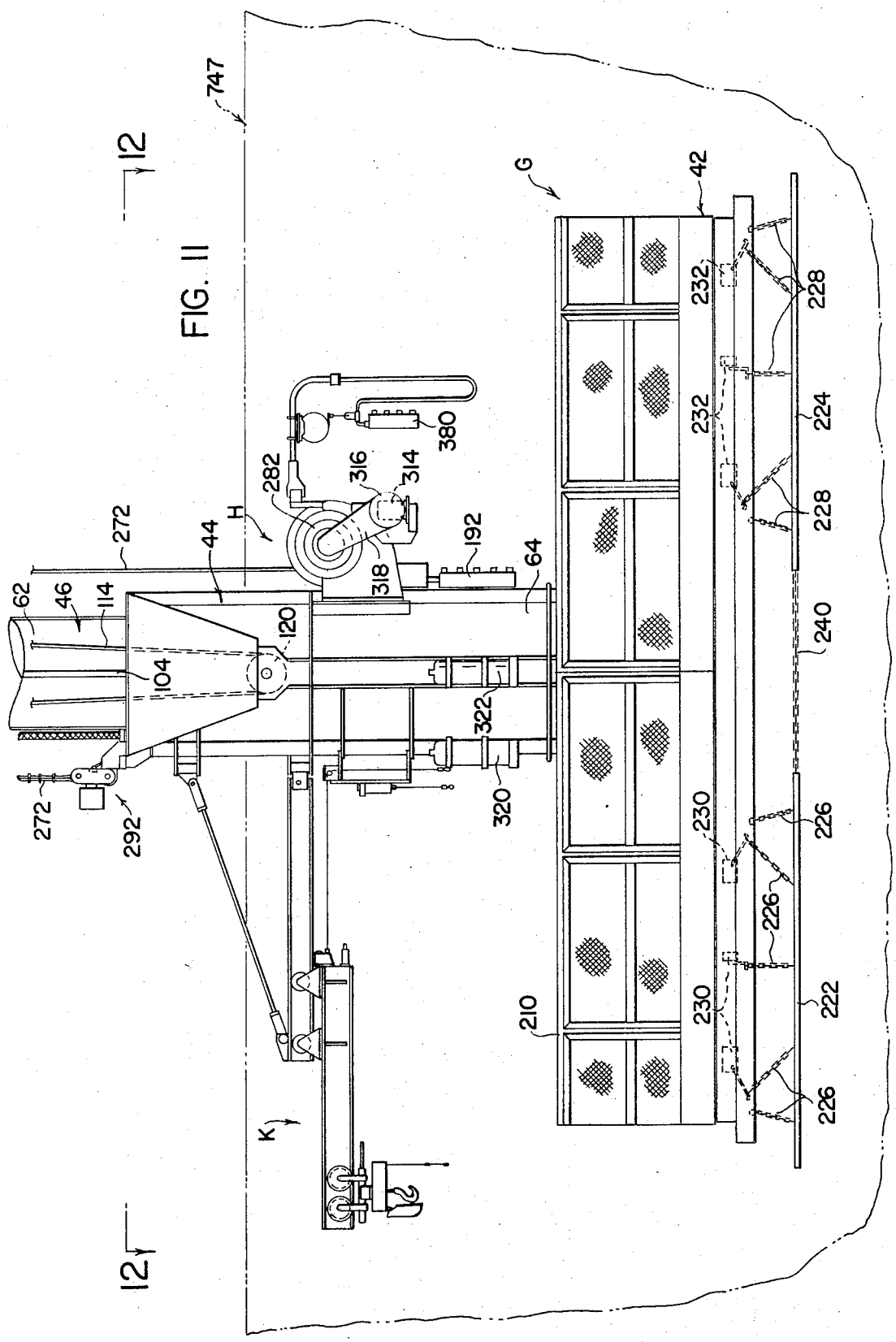
FIG. 11 is an enlarged view of the lower part of FIG. 2.
Figure 12:
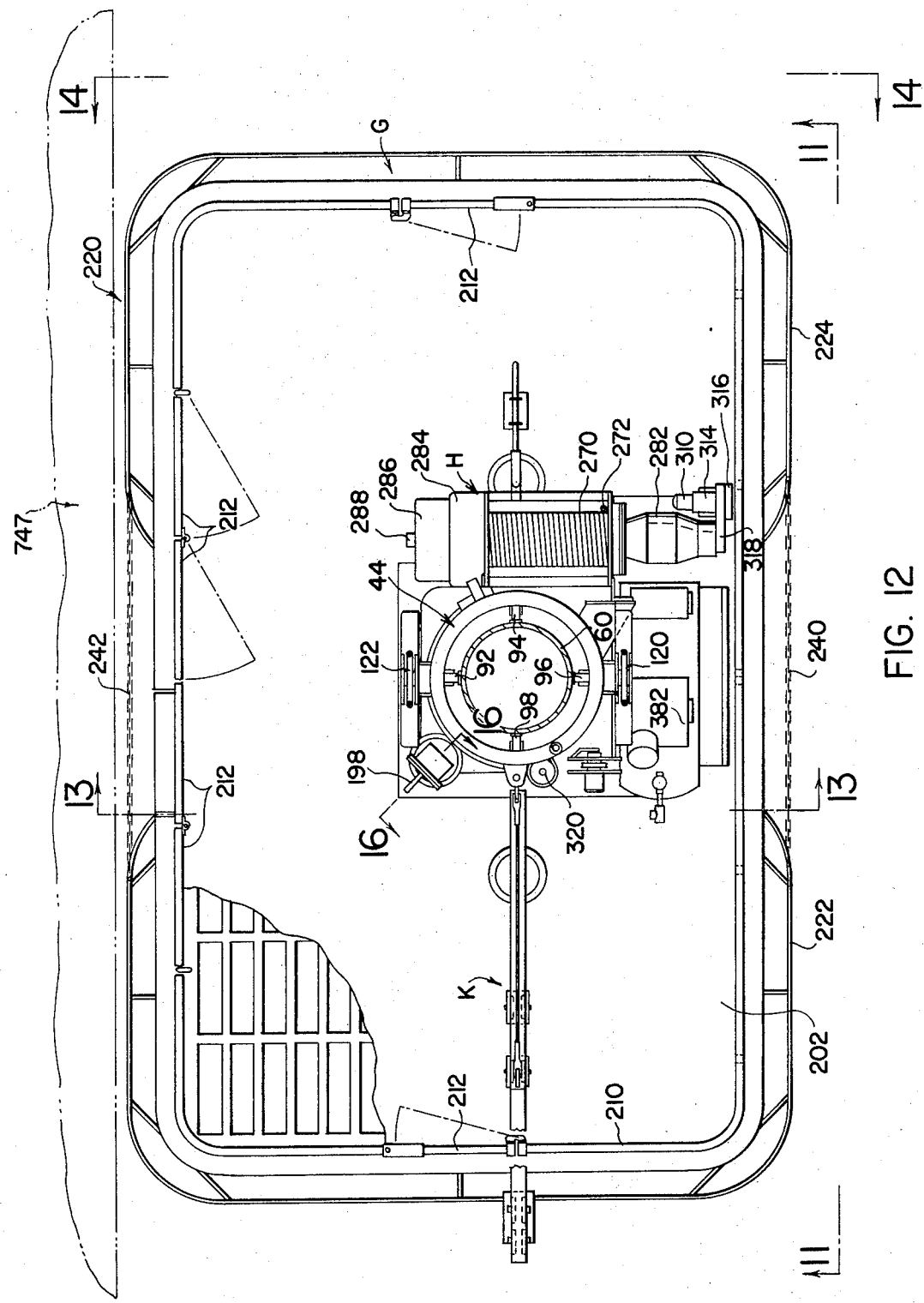
FIG. 12 is a view approximately on the line 12—12 of FIG. 10.
Figure 13:
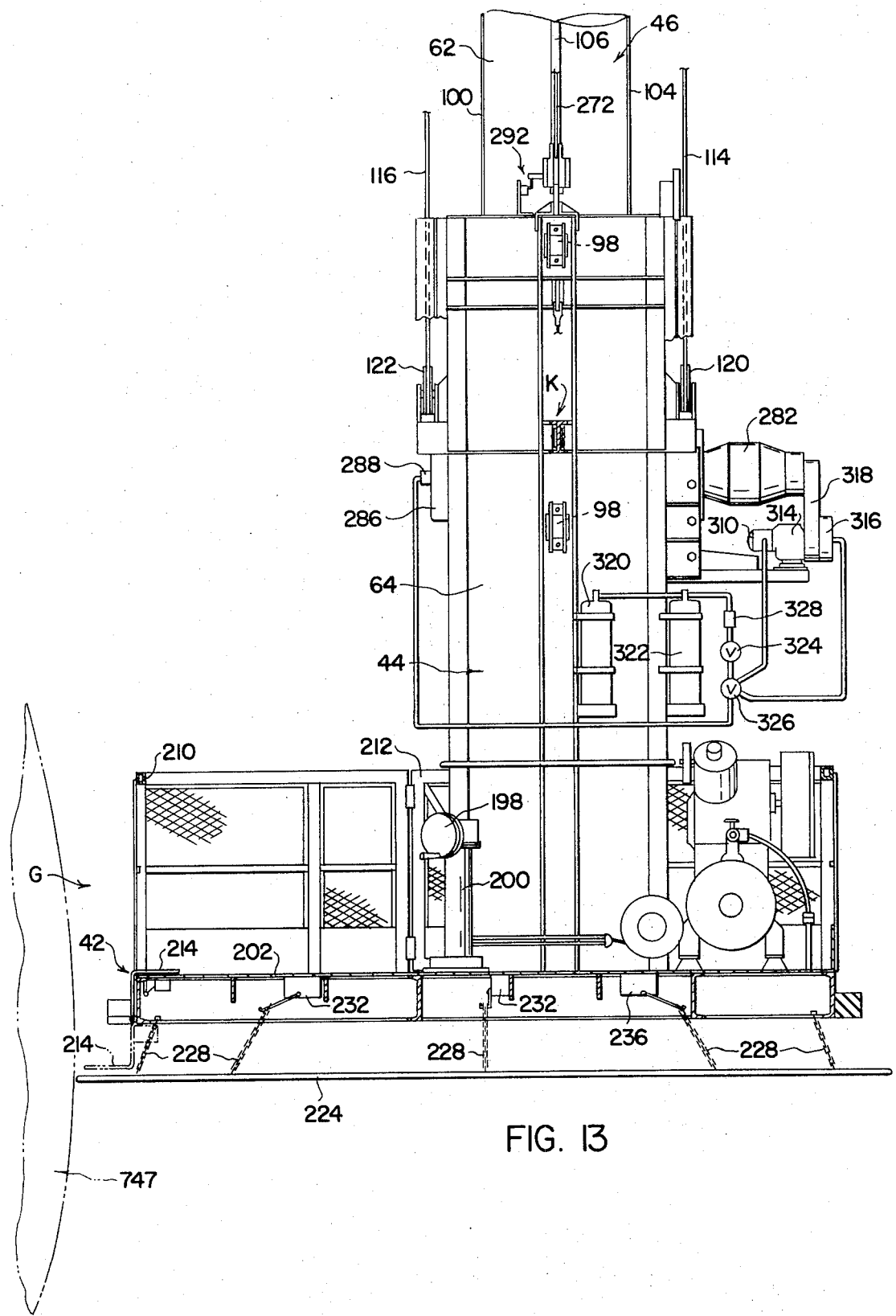
FIG. 13 is a view approximately on the line 13—13 of FIG. 12.
Figure 14:
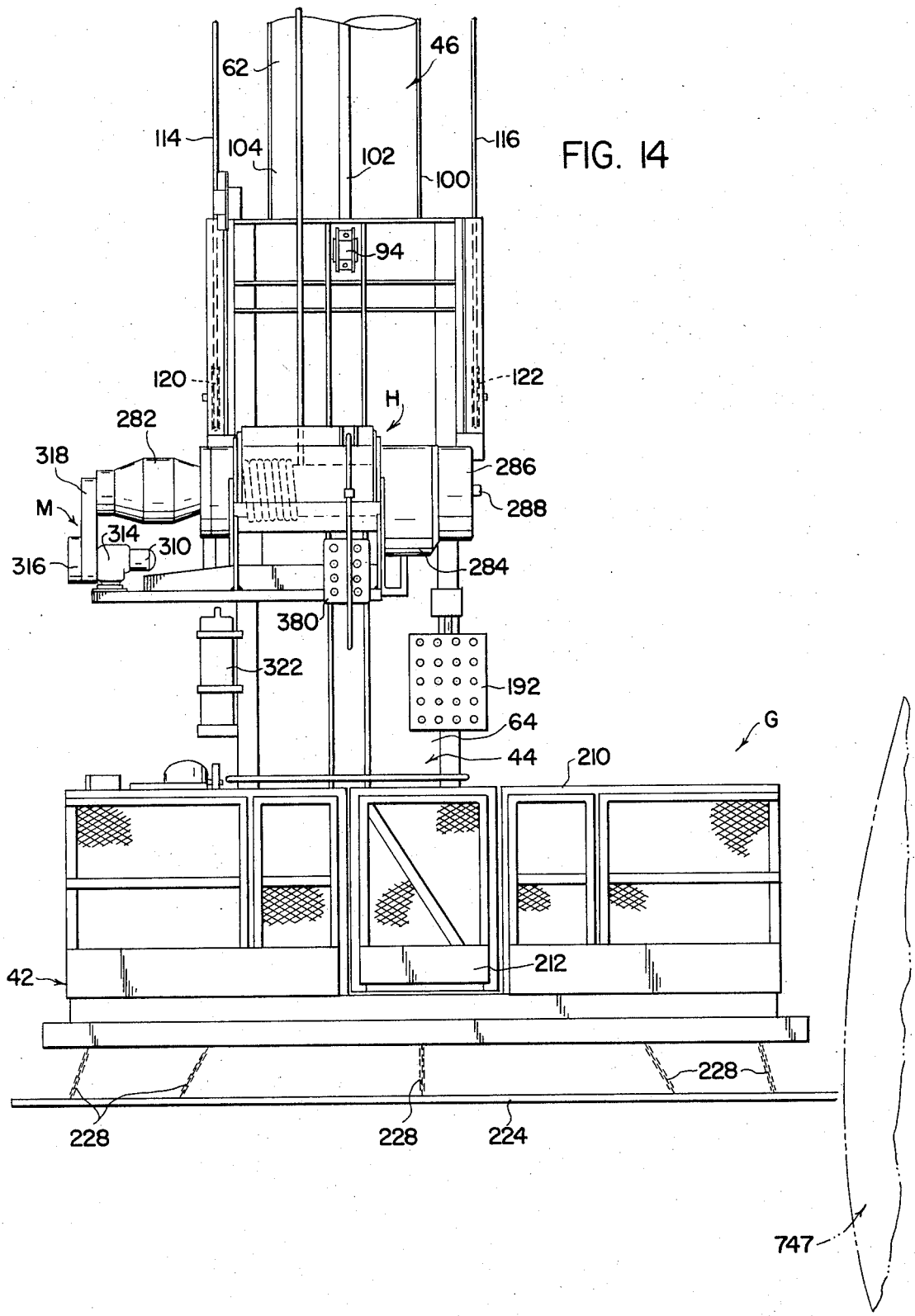
FIG. 14 is a view approximately on the line 14—14 of FIG. 12.
Figure 15:
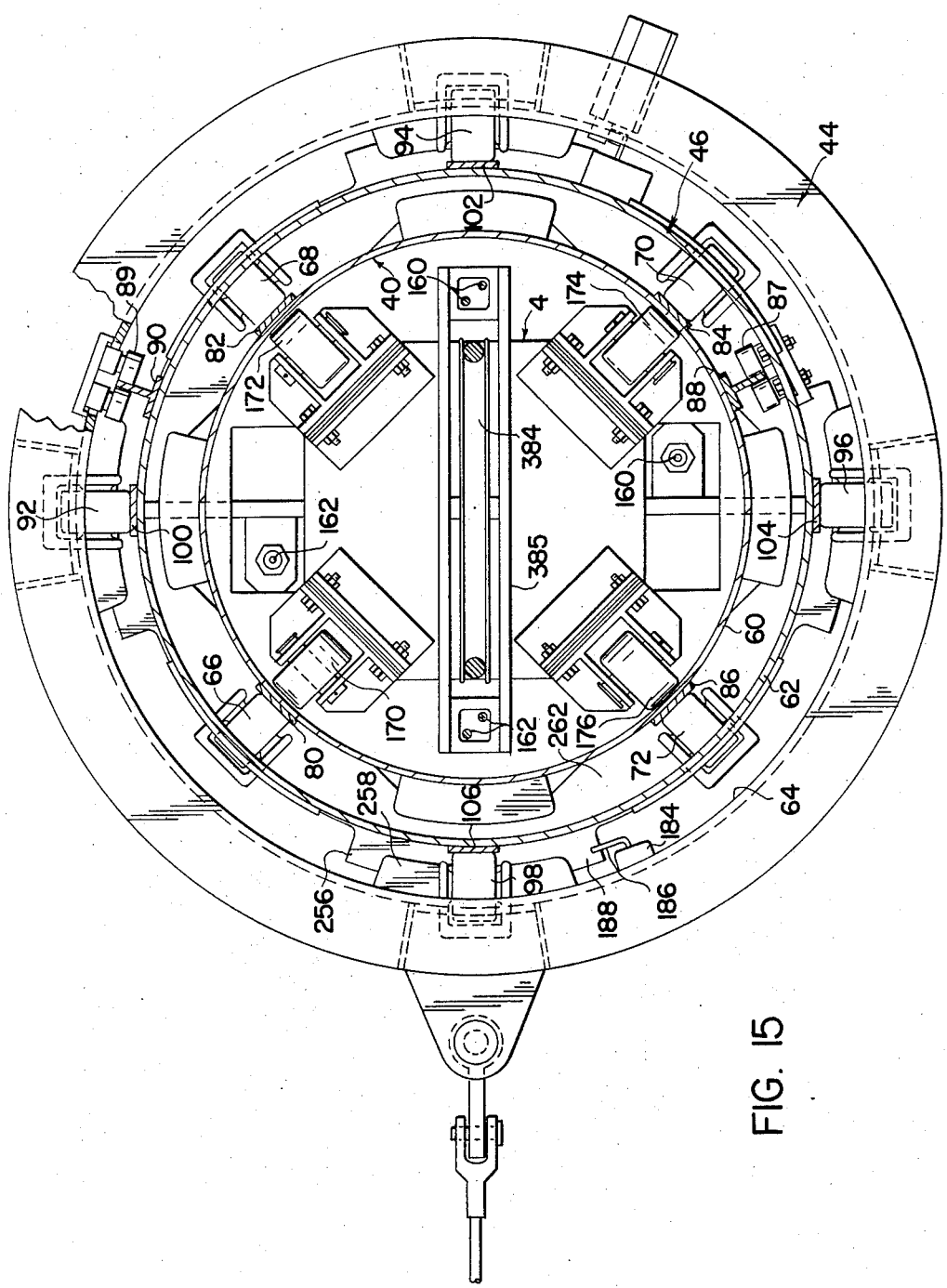
FIG. 15 is an enlarged sectional view approximately on the line 15—15 of FIG. 10.
Figure 18:
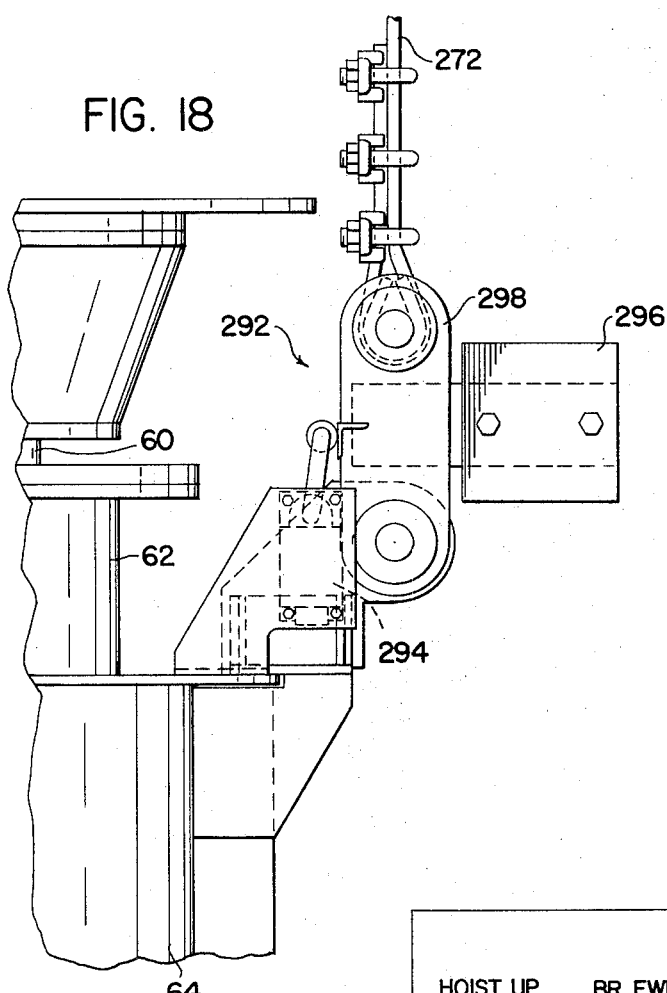
FIG. 18 is a view of FIG. 17 looking from the left.
Figure 17:
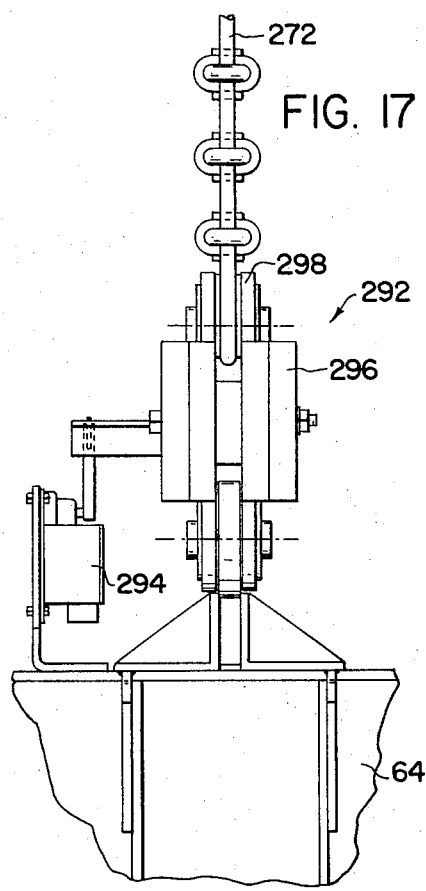
FIG. 17 is a fragmentary enlarged view of a portion of FIG. 13.
Figure 19:
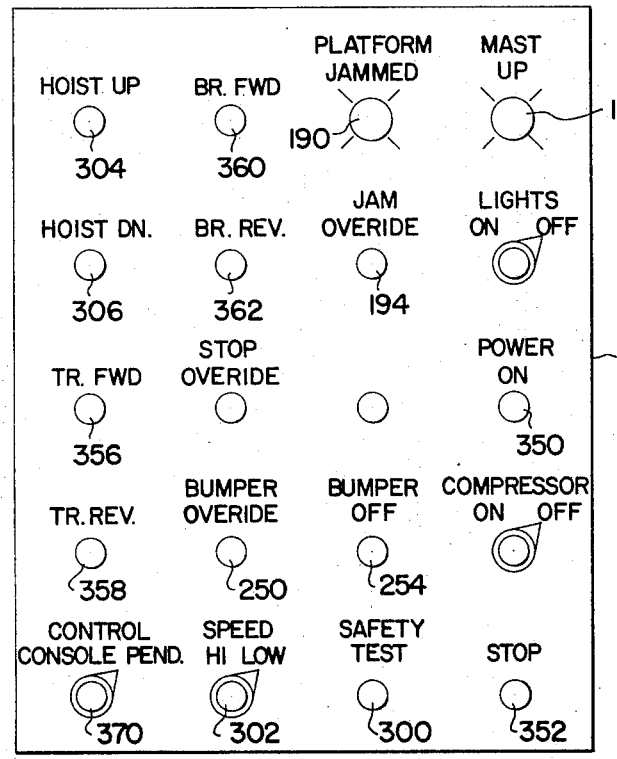
FIG 19 is an enlarged view of a portion of FIG. 14.

The main hoist 110 is a commercially available unit equipped with a built-in four circuit geared limit switch. Two of the circuits are wired into the platform or main hoist up control so as to reduce the speed of the hoist motor 140 as the telescopic mast approaches its collapsed condition illustrated in FIG. 3, and to stop the motor shortly before the upper end of the member 62 of the platform mast assembly 44 engages the underside of the trolley frame 110. More specifically before the flange 181 on the upper end of the member 62 extending outwardly therefrom and overlying the upper end of the member 64 is engaged by the upper end of the member 64. The other two circuits of the geared limit switch are connected in the platform down control so as to slow down the main hoist motor 140 as the telescopic mast section 44 approaches the lower end of its travel and to stop the motor as the telescopic mast section 44 reaches its lower limit of movement.

In addition to the controls provided by the geared limit switch, the apparatus is provided with an up limit switch 330 connected to the underside of the frame 10 of the trolley and connected in the main hoist up control circuit. The switch 330 is normally closed and is adapted to be opened to stop rotation of the main hoist when engaged by the upper end of the member 64 of the platform mast section 44. The switch 330 functions as a safety device for preventing the up end of the platform mast assembly 44 from being moved under power into engagement with the flange 181 on the upper end of the member 62 of the telescopic mast assembly or the underside of the trolley in the event of non-operation of the second circuit in the geared limit switch which is wired into the up platform control. A similar safety provision is not provided in the platform down control circuits since the movable mast sections and/or the platform cannot be moved by power into engagement with an obstruction therebeneath. If such an obstruction is engaged the main hoist cables will merely go slack and the slack limit switch 134 will stop the main hoist motor or the bumper ring assembly 220 will operate to stop the motor.

In addition to the aforementioned controls the main hoist 110 is provided with an external, centrifugal overspeed limit switch 344 and an overload limit switch (not shown). The overspeed switch 344 is driven from the safety cable 272, the speed of which is identical to the speed of the main lifting cables 114, 116 since they have identical reeving and the cable line speed determines exactly the vertical speed of the platfrom assembly G. If the platform speed ever reaches or exceeds a predetermined speed the switch 344 will be actuated and will stop the hoist and set both the main hoist brake on the motor 140 and the brake 286 of the safety system H. The centrifugal switch 344 provides protection against any situation where the platform G may tend to overspeed without actuating any other sensing device.

The safety system H could be operative or more specifically the brake 290 applied at all times when the main hoist motor 140 is not operating, if desired. It is preferred, however, to merely have the brake 290 applied as is the case in the embodiment shown wherein when some predetermined malfunction or abnormal condition exists in the apparatus such as the bumper ring assembly 220 being in contact with the airplane, a broken main hoist or counterweight cable, etc.

In addition to the high-low main hoist speed selector switch 302, the main hoist up switch 304, the main hoist down switch 306 and the safety test switch 300, etc. previously referred to, the control station 192 includes a power on push button switch 350, a power off stop push button switch 352, a trolley forward switch 356, a trolley reverse switch 358, a bridge forward switch 360, a bridge reverse switch 362 and a selector switch 370 for selectively transferring some of the controls between the console control panel 192 on the platform and a pendant control panel 372 which is movable by an operator so as to be accessible when at any position on the platform. If desired the control console could be located on the floor of the hanger and operatively connected to the apparatus by radio signal means. It is also to be understood that the pendant control panel could be connected to the end of a long cable such that the apparatus could be controlled from the floor of the hanger.

The electrical connections between the platform assembly G and the overhead parts of the apparatus are made in a conventional manner through a flexible cable 380. One end of the cable 380 is connected to an end of a conduit 382 on the trolley E and extending down through the stationary mast assembly 40 where it is reeved about an idler sheave 384 on the upper end of a weight 385 from which it extends upwardly over a sheave 386 on the trolley. From the sheave 386 the cable extends down along the exerior of the mast to the platform assembly.

In addition to the equipment referred to on the platform assembly, it will be understood that any equipment necessary for the service and/or repair of the vehicle with which the apparatus is employed may be located on the platform such as an air compressor 390, a flexible emergency escape ladder, not shown, etc. It is also to be understood that the manually operative valve 326 may be such that it can be operated from the floor of the hanger as by a flexible member, such as, a rope, connected thereto and dropped over one edge of the platform.

From the foregoing description of the preferred embodiment of the invention it will be apparent that the objects heretofore enumerated and others have been accomplished and that there has been provided a novel and improved apparatus which will afford access to substantially all of the exterior parts of an air-space vehicle and which is so constructed that it is substantially impossible, if not impossible, to so operate the apparatus as to damage the aircraft by contact therewith.

While the preferred embodiment of the invention has been described in considerable detail and as incorporated in an apparatus for servicing large airplanes, it will be understood that the invention is not limited to such use or to the construction shown and described but may be otherwise incorporated and modified as will be understood by those skilled in the art to which the invention relates. The mast, for example, can be connected to an overhead support which in turn is connected to the trolley for rotation about a vertical axis and/or the load support at the lower end of the mast could be other than a platform suitable for occupancy by persons and may, if desired, be fixed to the lower end of the mast.

Having thus described my invention what I claim is:

1. In apparatus for handling a load, an overhead support, a multi-section vertically oriented extensible and contractable mast having its upper end connected to said overhead support and a load support at its lower end, a hoist means including a rotatable drum member connected to said overhead support and a flexible member operatively connected to said rotatable member and said load support for raising and lowering said load support, a rotatable member separate from said hoist means having a flexible member connected thereto, said members being operatively connected to said overhead support and to said load support, means separate from said hoist means biasing said rotatable member in the direction to maintain said flexible member taut, means separate from said hoist means for selectively preventing rotation of said rotatable member, and means for operating said last-named means to prevent rotation of said rotatable member upon the existence of a predetermined condition of said apparatus.

2. In apparatus for handling a load, an overhead support, a multi-section vertically oriented extensible and contractable mast having its upper end connected to said overhead support and a load support at its lower end, a hoist means including a rotatable drum member connected to said overhead support and a flexible member operatively connected to said rotatable member and said load support for raising and lowering said load support, a rotatable member separate from said hoist means having a flexible member connected thereto, said members being operatively connected to said overhead support and to said load support, means separate from said hoist means biasing said rotatable member in the direction to maintain said flexible member taut, brake means separate from said hoist means for selectively preventing rotation of said rotatable member, and means for operating said brake means during the existence of a predetermined condition in said apparatus.

3. In apparatus for handling a load, an overhead support movable in a horizontal plane, a multi-section vertically oriented extensible and contractable mast having the upper end of the uppermost mast section fixedly connected to said overhead support and at least one mast section movable lengthwise along another mast section, a load support connected to said one mast section, a hoist means including a rotatable drum member connected to said overhead support and a flexible member operatively connected to said rotatable member and said load support for raising and lowering said load support, a rotatable member separate from said hoist means having a flexible member connected thereto, one of said members being connected to said overhead support and the other of said members being connected to said load support, means separate from said hoist means biasing said rotatable member in the direction to maintain said flexible member taut, selectively operable means separate from said hoist means for preventing rotation of said rotatable member, and means for operating said selectively operable means upon the existence of a predetermined condition in said apparatus.

4. In apparatus for servicing aircraft, an overhead support universally movable in a horizontal plane, a multi-section vertically oriented extensible and contractable mast having the upper end of the uppermost mast section connected to said overhead support and at least one mast section movable lengthwise along another mast section, a personnel supporting platform connected to said mast, a hoist means including a rotatable drum member connected to said overhead support and a flexible member operatively connected to said drum member and said platform for raising and lowering said platform, a rotatable member separate from said hoist means having a flexible member connected thereto, one of said members being operatively connected to said overhead support and the other to said platform, means separate from said hoist means biasing said rotatable member in the direction to maintain said flexible member taut, means separate from said hoist means for selectively preventing rotation of said rotatable member, and means for operating said last-named means to prevent rotation of said rotatable member upon the existence of a predetermined condition of said apparatus.

5. In apparatus for servicing aircraft, an overhead support universally movable in a horizontal plane, a multi-section vertically oriented extensible and contractable mast having the upper end of the uppermost mast section fixedly connected to said overhead support and at least one mast section movable lengthwise along another mast section, a personnel supporting platform connected to said mast, a hoist means including a rotatable drum member connected to said overhead support and a flexible member operatively connected to said drum member and said platform, a rotatable member separate from said hoist means having a flexible member connected thereto, said members being connected to said overhead support and said platform, means separate from said hoist means biasing said rotatable member in the direction to maintain said flexible member taut, a selectively operable brake means separate from said hoist means connected to said rotatable member, and means for operating said brake means during the existence of a predetermined condition of said apparatus.

6. In apparatus for handling a load, an overhead support universally movable in a horizontal plane, a multi-section vertically oriented extensible and contractable mast having the upper end of the uppermost mast section connected to said overhead support and at least one mast section movable lengthwise along another mast section, at least two vertically spaced sets of rollers carried by one of two relatively movable said mast sections and engaging the other with a preload supporting said two relatively movable mast sections for movement relative to one another, a load support connected to said mast, a hoist means including a rotatable drum member connected to said overhead support and a flexible member operatively connected to said rotatable member and said load support for raising and lowering said load support, a rotatable member separate from said hoist means having a flexible member connected thereto, means operatively connecting one of said members to said overhead support and the other of said members to said load support, means separate from said hoist means biasing said rotatable member in the direction to maintain said flexible member taut, selectively operable means separate from said hoist means for preventing rotation of said rotatable member, and means for operating said selectively operable means to prevent rotation of said rotatable member during the existence of a predetermined condition of said apparatus.

7. In apparatus for servicing aircraft, an overhead support universally movable in a horizontal plane, a multi-section vertically oriented extensible and contractable mast having the upper end of the uppermost mast section fixedly connected to said overhead support and at least one mast section movable lengthwise along another mast section, at least two vertically spaced sets of rollers carried by one of two relatively movable said mast sections and engaging the other with a preload supporting said two relatively movable mast sections for movement relative to one another, a personnel supporting platform connected to said mast, hoist means including a rotatable drum member connected to said overhead support and a flexible member operatively connected to said drum member and said platform for raising and lowering said platform, a rotatable member separate from said hoist means having a flexible member connected thereto, one of said members being operatively connected to said overhead support and the other to said platform, means separate from said hoist means biasing said rotatable member in the direction to maintain said flexible member taut, selectively operable brake means separate from said hoist means connected to said rotatable member, and means for operating said brake means to prevent rotation of said rotatable member during the existence of a predetermined condition of said apparatus.

8. In apparatus for servicing aircraft, an overhead support universally movable in a horizontal plane, a multi-section vertically oriented extensible and contractable mast having the upper end of the uppermost mast section fixedly connected to said overhead support and at least one mast section movable lengthwise along another mast section, a personnel supporting platform connected to said mast, hoist means including a rotatable drum member connected to said overhead support and a flexible member operatively connected to said drum member and said platform for raising and lowering said platform, a rotatable member separate from said hoist means having a flexible member connected thereto, means operatively connecting one of said members to said overhead support and the other of said members to said platform, means separate from said hoist means biasing said rotatable member in the direction to maintain said flexible member taut, a brake separate from said hoist means connected to said rotatable member, an abutment member operatively connected to said platform for movement both vertically and horizontally thereof and extending horizontally of and below said platform, means for preventing operation of said hoist means when said abutment member is in a predetermined position relative to said platform, and means for applying said brake when a predetermined condition exists in said apparatus including said predetermined relative position between said abutment member and said platform.

9. In apparatus for serving aircraft, an overhead support universally movable in a horizontal plane, a multi-section vertically oriented extensible and contractable mast having the upper end of the uppermost mast section connected to said overhead support and at least one mast section movable lengthwise along another mast section, a load support connected to said one mast section, hoist means including a rotatable drum member connected to said overhead support and a flexible member operatively connected to said rotatable member and said load support for raising and lowering said load support, a rotatable member separate from said hoist means having a flexible member connected thereto, means operatively connecting one of said members to said overhead support and the other of said members to said load support, means separate from said hoist means biasing said rotatable member in the direction to maintain said flexible member taut, a fluid-operated motor separate from said hoist means for rotating said rotatable member, a source of fluid under pressure, and means for controlling and applying fluid under pressure to said motor.

10. In apparatus for serving aircraft, an overhead support universally movable in a horizontal plane, a multi-section vertically oriented extensible and contractable mast having the upper end of the uppermost mast section connected to said overhead support and at least one mast section movable lengthwise along another mast section, a load support connected to said one mast support, hoist means including a rotatable drum member connected to said overhead support and a flexible member operatively connected to said rotatable member and said load support for raising and lowering said load support, a rotatable member connected to said load support and having a flexible member connected thereto, means operatively connecting said flexible member to said overhead support, means biasing said rotatable member in the direction to maintain said flexible member taut, a brake connected to said rotatable member, means for applying said brake when a predetermined condition exists in said apparatus, a fluid-operated motor for rotating said rotatable member, a source of fluid under pressure, and means for releasing said brake and applying fluid under pressure to said motor.

11. In apparatus for servicing aircraft, an overhead support universally movable in a horizontal plane, a multi-section vertically oriented extensible and contractable mast having the upper end of the uppermost mast section fixedly connected to said overhead support and at least one mast section movable lengthwise along another mast section, a personnel supporting platform connected to said one mast section, hoist means including a rotatable drum member connected to said overhead support and a flexible member operatively connected to said drum member and said platform for raising and lowering said platform, a rotatable member connected to said platform and having a flexible member connected thereto, means operatively connecting said flexible member to said overhead support, means biasing said rotatable member in the direction to maintain said flexible member taut, a brake connected to said rotatable member, an abutment member operatively connected to said platform for movement both vertically and horizontally thereof and extending horizontally of and below said platform, means operatively connected between said abutment member and said hoist means and said brake for preventing operation of said hoist means when said abutment member is in a predetermined position relative to said platform and for applying said brake when a predetermined condition exists in said apparatus including said relative position between said abutment member and said platform, a fluid operated motor operatively connected to said rotatable member, a source of fluid under pressure, and a manually operable valve means for controlling the flow of fluid under pressure from said source to said motor.

12. In apparatus for servicing aircraft, an overhead support universally movable in a horizontal plane, a multi-section vertically oriented extensible and contractable mast having the upper end of the uppermost mast section fixedly connected to said overhead support and at least one mast section movable lengthwise along another mast section, at least two vertically spaced sets of rollers carried by one of two relatively movable said mast sections and engaging the other with a preload supporting said two relatively movable mast sections for movement relative to one another, a personnel supporting platform connected to said mast, hoist means including a rotatable drum member connected to said overhead support and a flexible member operatively connected to said drum member and said platform for raising and lowering said platform, a rotatable member separate from said hoist means having a flexible member connected thereto, means operatively connecting one of said members to said overhead support and the other of said members to said platform, means separate from said hoist means biasing said rotatable member in the direction to maintain said flexible member taut, a brake separate from said hoist means connected to said rotatable member, an abutment member operatively connected to said platform for movement both vertically and horizontally thereof and extending horizontally of and below said platform, and means operatively connected between said abutment member and said hoist means and said brake for preventing operation of said hoist means when said abutment member is in a predetermined position relative to said platform and for applying said brake when a predetermined condition exists in said apparatus including said relative position between said abutment member and said platform.

13. In apparatus for servicing aircraft, an overhead support universally movable in a horizontal plane, a multi-section vertically oriented extensible and contractable mast having the upper end of the uppermost mast section fixedly connected to said overhead support and at least one mast section movable lengthwise along another mast section, at least two vertically spaced sets of rollers carried by one of two relatively movable said mast sections and engaging the other with a preload supporting said two relatively movable mast sections for movement relative to one another, a personnel supporting platform connected to said mast, hoist means including a rotatable drum member connected to said overhead support and a flexible member operatively connected to said drum member and said platform for raising and lowering said platform, a rotatable member separate from said hoist means having a flexible member connected thereto, means operatively connecting one of said members to said overhead support and the other to said platform, means separate from said hoist means biasing said rotatable member in the direction to maintain said flexible member taut, a fluid-operated motor separate from said hoist means for rotating said rotatable member, a source of fluid under pressure, and a manually operable control member for controlling the flow of fluid under pressure from said source to said motor.

14. In apparatus for servicing aircraft, an overhead support universally movable in a horizontal plane, a multi-section vertically oriented extensible and contractable mast having the upper end of the uppermost mast section fixedly connected to said overhead support and at least one mast section movable lengthwise along another mast section, at least two vertically spaced sets of rollers carried by one of two relatively movable said mast sections and engaging the other with a preload supporting said two relatively movable mast sections for movement relative to one another, a personnel supporting platform connected to said mast, hoist means including a rotatable drum member connected to said overhead support and a flexible member operatively connected to said drum member and said platform for raising and lowering said platform, a rotatable member connected to said platform and having a flexible member connected thereto, means operatively connecting said rotatable member to said overhead support, means biasing said rotatable members in the direction to maintain said flexible member taut, a brake connected to said rotatable member, an abutment member operatively connected to said platform for movement both vertically and horizontally thereof and extending horizontally of and below said platform, means operatively connected between said abutment member, said hoist means and said brake for preventing operation of said hoist means with said abutment member in a predetermined position relative to said platform and for applying said brake when a predetermined condition exists in said apparatus including said relative position between said abutment member and said platform, a fluid-operated motor for rotating said rotatable member, a source of fluid under pressure, and a manually operable control means connecting said motor with said source of fluid pressure and releasing said brake.

15. In apparatus for servicing aircraft, an overhead support universally movable in a horizontal plane, a multi-section vertically oriented extensible and contractable mast having the upper end of the uppermost mast section fixedly connected to said overhead support and at least one mast section movable lengthwise along another mast section, at least two vertically spaced sets of rollers carried by one of two relatively movable said mast sections and engaging the other with a preload supporting said two relatively movable mast sections for movement relative to one another, a personnel supporting platform rotatably connected to the lowermost of the relatively movable said mast sections adjacent to its lower end, a hand crank on said platform for rotating said platform, hoist means including a rotatable drum member connected to said overhead support and a flexible member operatively connected to said drum member and said platform for raising and lowering said platform, a rotatable drum connected to the lowermost of the relatively movable said mast sections, a cable connected to said drum and to said overhead support, means biasing said drum in the direction to maintain said cable taut, means for selectively preventing rotation of said drum, and means for operating said last-named means to prevent rotation of said drum when a predetermined condition exists in said apparatus.

16. In apparatus for servicing aircraft, an overhead support universally movable in a horizontal plane, a multi-section vertically oriented extensible and contractable mast having the upper end of the uppermost mast section fixedly connected to said overhead support and an intermediate mast section movable lengthwise along said uppermost mast section and a lowermost mast section movable lengthwise along said intermediate mast section, a personnel supporting platform connected to said lowermost mast section adjacent to its lower end, hoist means including a rotatable drum member connected to said overhead support and a flexible member operatively connected to said drum member and said platform for raising and lowering said platform, a counterweight operatively connected to said overhead support and said intermediate mast section biasing said intermediate mast section in an upwardly direction, means limiting relative movement between said intermediate and lowermost mast sections, a rotatable member separate from said hoist means having a flexible member connected thereto, means operatively connecting one of said members to said overhead support and the other of said members to said lowermost mast section, means separate from said hoist means biasing said rotatable member in the direction to maintain said flexible member taut, means separate from said hoist means for selectively preventing rotation of said rotatable member, and means for operating said last-named means to prevent rotation of said rotatable member when a predetermined condition exists in said apparatus.

17. In apparatus for servicing aircraft, an overhead support universally movable in a horizontal plane, a multi-section vertically oriented extensible and contractable mast having the upper end of the uppermost mast section fixedly connected to said overhead support and an intermediate mast section movable lengthwise along said uppermost mast section and a lowermost mast section movable lengthwise along said intermediate mast section, at least two vertically spaced sets of rollers carried by one of said uppermost and intermediate mast sections and engaging the other mast section with a preload supporting said intermediate mast section for movement along said uppermost mast section, at least two vertically spaced sets of rollers carried by one of said intermediate and lowermost mast sections and engaging the other mast section with a preload supporting said lowermost mast section for movement along said intermediate mast section, a personnel supporting platform connected to said lowermost mast section adjacent to its lower end, hoist means operatively connected to said overhead support and said lowermost mast section for raising and lowering said platform, a counterweight operatively connected to said overhead support and said intermediate mast section biasing said intermediate mast section in an upwardly direction, means limiting relative movement between said intermediate and lowermost mast sections, a rotatable member having a flexible member connected thereto, means operatively connecting said flexible member to said overhead support and said rotatable member to said lowermost mast section, means biasing said rotatable member in the direction to maintain said flexible members taut, a brake connected to said rotatable member, and means for operating said brake to prevent rotation of said rotatable member when a predetermined condition exists on said apparatus.

18. In apparatus for servicing aircraft, an overhead support universally movable in a horizontal plane, a multi-section vertically oriented extensible and contractable mast having the upper end of the uppermost mast section fixedly connected to said overhead support and an intermediate mast section movable lengthwise along said uppermost mast section and a lowermost mast section movable lengthwise along said intermediate mast section, at least two vertically spaced sets of rollers carried by one of said uppermost and intermediate mast sections and engaging the other mast section with a preload supporting said intermediate mast sections for movement along said uppermost mast section, at least two vertically spaced sets of rollers carried by one of said intermediate and lowermost mast sections and engaging the other mast section with a preload supporting said lowermost mast section for movement along said intermediate mast sections, a personnel supporting platform connected to said lowermost mast section adjacent to its lower end, hoist means operatively connected to said overhead support and said lowermost mast section for raising and lowering said platform, a counterweight operatively connected to said overhead support and said intermediate mast section biasing said intermediate mast section in an upwardly direction, means limiting relative movement between said intermediate and lowermost mast sections, a rotatable drum on said lowermost mast section and having a cable connected thereto, means operatively connecting said cable to said overhead support, means biasing said drum in the direction to maintain said cable taut, a brake connected to said drum, an abutment member operatively connected to said platform for movement both vertically and horizontally thereof and extending horizontally of and below said platform, and means operatively connected between said abutment member and hoist means and said brake preventing operation of said hoist means with said abutment member in a predetermined position relative to said platform and for applying said brake when a predetermined condition exists in said apparatus including said relative position between said abutment member and said platform.

19. In apparatus for servicing aircraft, an overhead support universally movable in a horizontal plane, a multi-section vertically oriented extensible and contractable mast having the upper end of the uppermost mast section fixedly connected to said overhead support and an intermediate mast section movable lengthwise along said uppermost mast section and a lowermost mast section movable lengthwise along said intermediate mast section, at least two vertically spaced sets of rollers carried by one of said uppermost and intermediate mast sections and engaging the other mast section with a preload supporting said intermediate mast section for movement along said uppermost mast section, at least two vertically spaced sets of rollers carried by one of said intermediate and lowermost mast sections and engaging the other mast section with a preload supporting said lowermost mast section for movement along said intermediate mast section, a personnel supporting platform connected to said lowermost mast section adjacent to its lower end, hoist means operatively connected to said overhead support and said lowermost mast section for raising and lowering said platform, a counterweight operatively connected to said overhead support and said intermediate mast section having said intermediate mast section biasing said intermediate mast section in an upwardly direction, means limiting relative movement between said intermediate and lowermost mast sections, a rotatable drum connected to said lowermost mast section and having a cable connected thereto, means operatively connecting said cable to said overhead support, means biasing said drum in the direction to maintain said cable taut, a fluid-operated motor for rotating said drum, a source of fluid under pressure on said platform, and valve means for controlling the flow of fluid under pressure from said source to said motor.

20. In apparatus for servicing aircraft, an overhead support universally movable in a horizontal plane, a multi-section vertically oriented extensible and contractable mast having the upper end of the uppermost mast section fixedly connected to said overhead support and an intermediate mast section movable lengthwise along said uppermost mast section and a lowermost mast section movable lengthwise along said intermediate mast section, at least two vertically spaced sets of rollers carried by one of said uppermost and intermediate mast sections and engaging the other mast section with a preload supporting said intermediate mast section for movement along said uppermost mast section, at least two vertically spaced sets of rollers carried by one of said intermediate and lowermost mast sections and engaging the other mast section with a preload supporting said lowermost mast section for movement along said intermediate mast section, a load support connected to said lowermost mast section adjacent to its lower end, hoist means operatively connected to said overhead support and said lowermost mast section for raising and lowering said load support, a counterweight operatively connected to said overhead support and said intermediate mast section biasing said intermediate mast section in an upwardly direction, means limiting relative movement between said intermediate and lowermost mast sections, a rotatable drum connected to said lower mast section and having a cable connected thereto, means operatively connecting said cable to said overhead support, means biasing said drum in the direction to maintain said cable taut, a brake connected to said drum, an abutment member operatively connected to said platform for movement both vertically and horizontally thereof and extending horizontally of and below said platform, means operatively connected between said abutment member and said hoist means and said brake for preventing operation of said hoist means with said abutment member in a predetermined position relative to said platform and for applying said brake when a predetermined condition exists in said apparatus including said relative position between said abutment member and said platform, a fluid-operated motor for rotating said drum, a source of fluid under pressure on said platform, and a manually operable control member for controlling the flow of fluid under pressure from said source to said motor and for releasing said brake.

* * * * *